United States Patent [19]

Harshberger, Jr.

[11] 4,232,257
[45] Nov. 4, 1980

[54] WEB TRANSPORT CAPSTAN CONTROL SYSTEM

[75] Inventor: Robert P. Harshberger, Jr., San Jose, Calif.

[73] Assignee: Ampex Corporation, Redwood City, Calif.

[21] Appl. No.: 682,849

[22] Filed: May 3, 1976

[51] Int. Cl.³ .............................................. H02P 5/16
[52] U.S. Cl. .................................. 318/314; 318/313; 318/328; 318/608; 318/270; 360/73
[58] Field of Search ............... 318/313, 314, 318, 328, 318/329, 341, 608, 6, 7, 55, 56, 257–259, 269, 270; 360/73

[56] References Cited

U.S. PATENT DOCUMENTS

| | | | |
|---|---|---|---|
| 3,185,364 | 4/1965 | Kleist | 226/178 |
| 3,293,522 | 12/1966 | Lewis | 318/314 |
| 3,482,229 | 12/1969 | Burr | 318/341 |
| 3,577,056 | 5/1971 | Tsujikawa | 318/318 |
| 3,648,141 | 3/1972 | Scheer | 318/314 |
| 3,693,061 | 9/1972 | Kahle | 318/7 |
| 3,889,169 | 6/1975 | Hirschman | 318/608 |
| 3,969,663 | 7/1976 | Arthur et al. | 318/561 |
| 4,002,962 | 1/1977 | Miller | 318/314 |

OTHER PUBLICATIONS

James C. Strickland, "Optimizing Tape Transport Motion Control Using Operational Amplifier Analog Signal Processing", Journal of the Audio Engineering Society.

*Primary Examiner*—David Smith, Jr.
*Assistant Examiner*—Michael K. Mutter
*Attorney, Agent, or Firm*—Robert G. Clay; Gregory L. Roth

[57] ABSTRACT

A professional audio tape transport capstan control system includes a single capstan continuously engaging a length of tape to provide bidirectional motion control in all modes of operation. A D.C. capstan drive motor is directly coupled to the capstan and energized for precise control over tape motion. A hybrid servo switches between digital position phase lock velocity control and analog constant acceleration control to provide both precise control over play speed and rapid acceleration. With acceleration to a stabilized play speed occurring in less than 0.5 sec an operator may treat the acceleration time as instantaneous for most applications.

52 Claims, 7 Drawing Figures

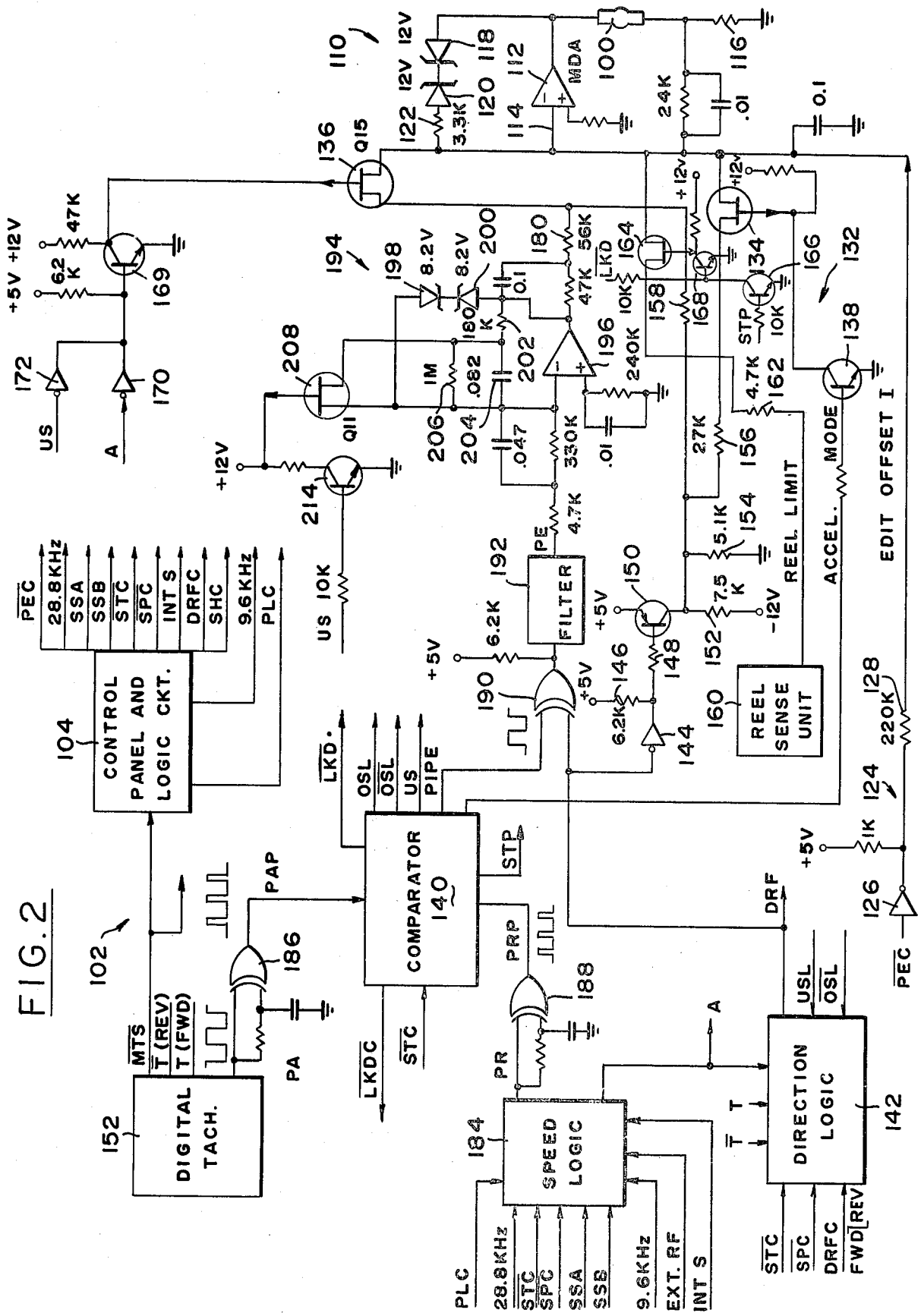

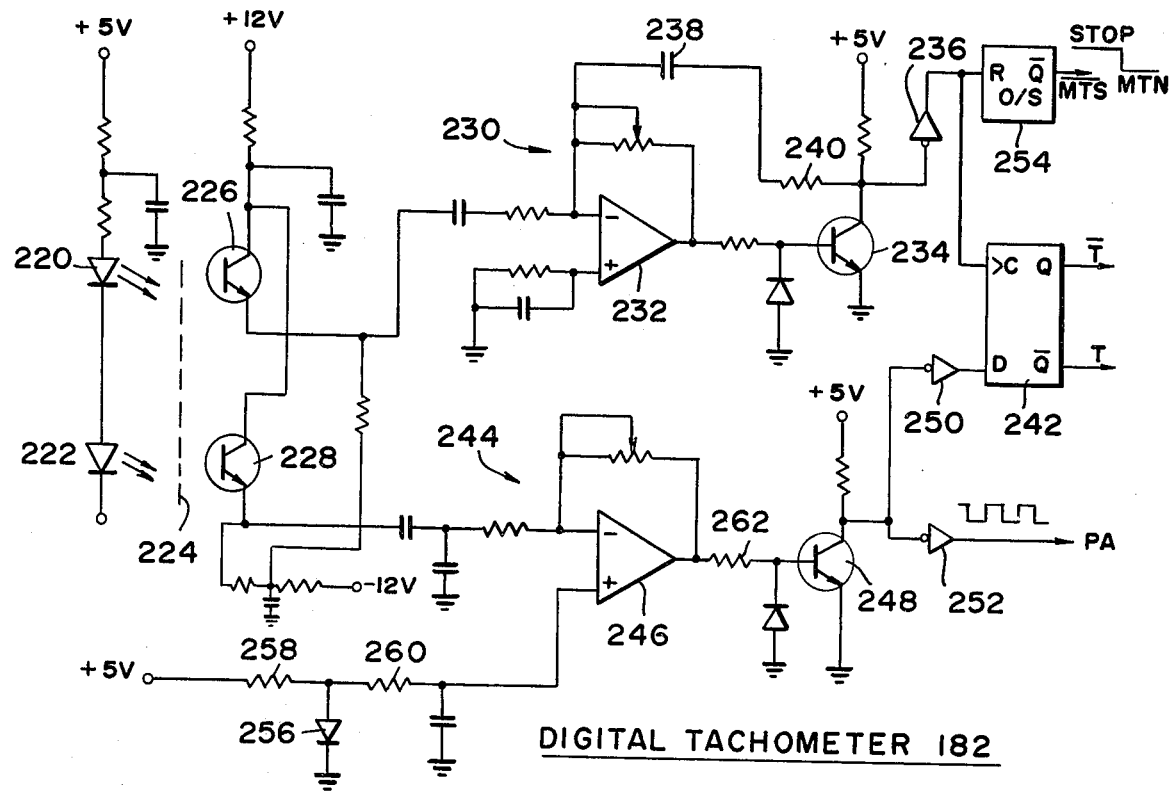
FIG.3 DIGITAL TACHOMETER 182
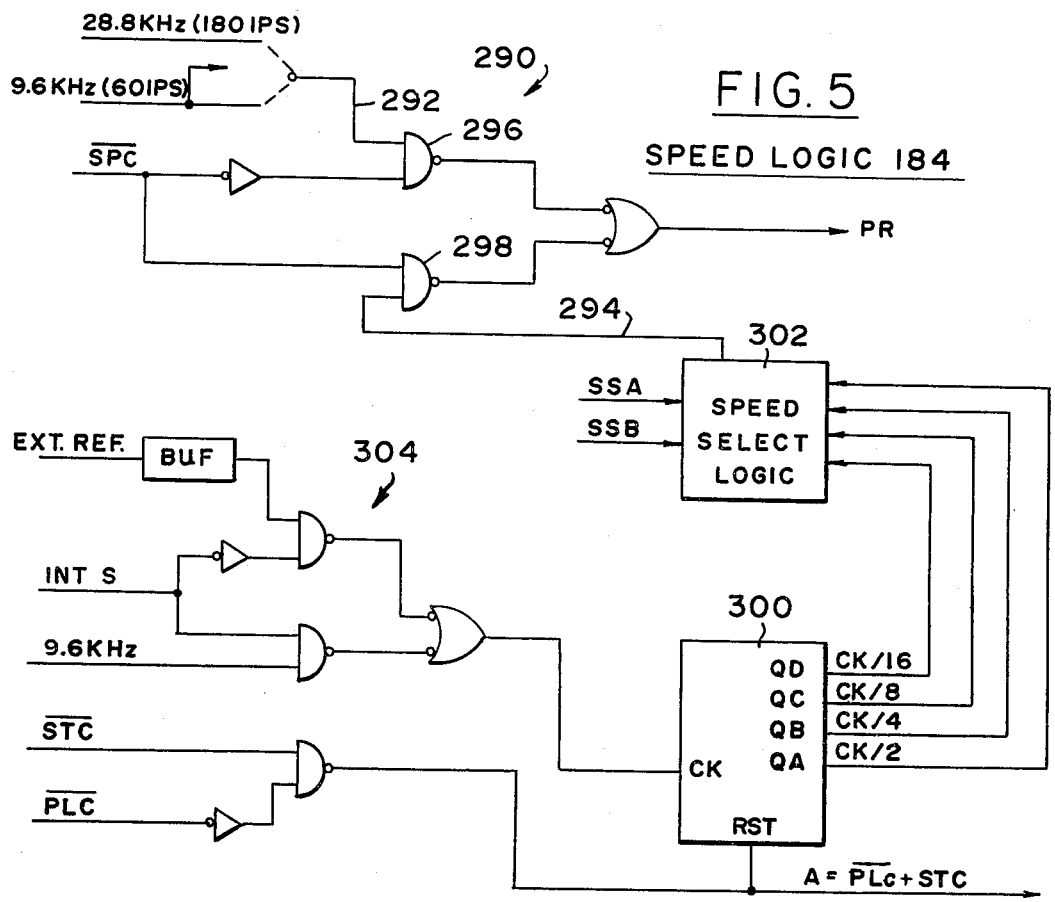
FIG.5 SPEED LOGIC 184

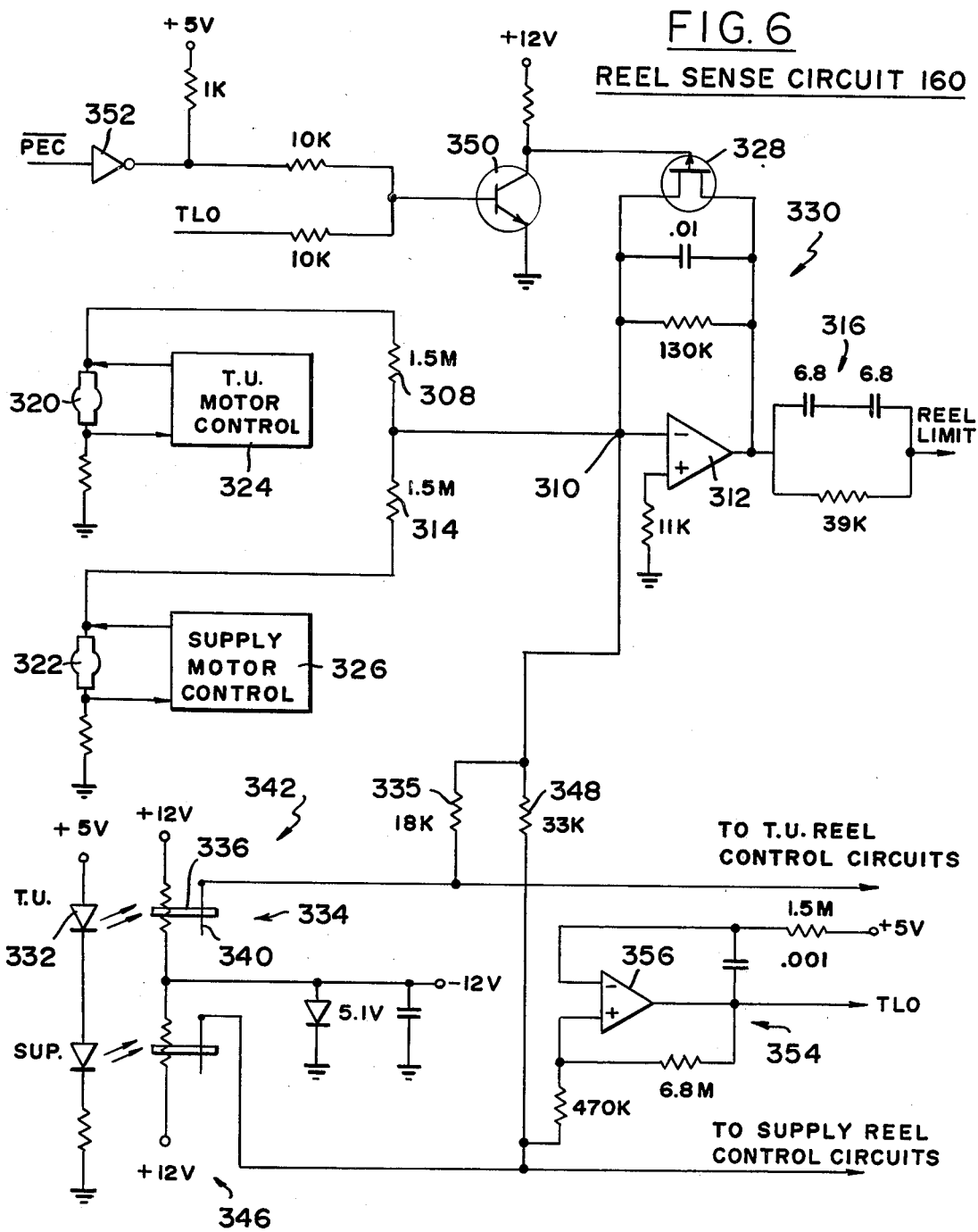
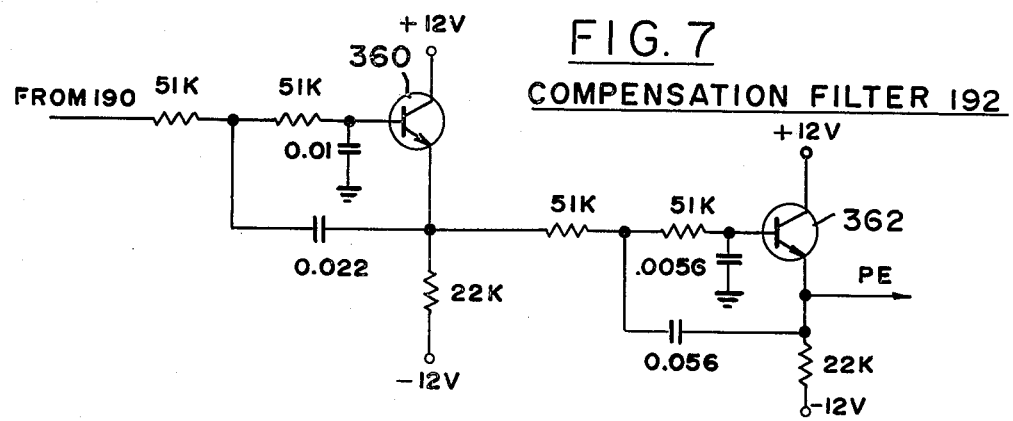

WEB TRANSPORT CAPSTAN CONTROL SYSTEM

CROSS REFERENCE TO RELATED APPLICATIONS

This application is related to the following applications which are filed simultaneously herewith:

1. Switching Motor Control System, application Ser. No. 682,372, filed May 3, 1976, by Robert Perrine Harshberger, Jr., now U.S. Pat. No. 4,129,810.
2. Web Transport System, application Ser. No. 682,373, filed May 3, 1976, by Roger S. Sleger, now U.S. Pat. No. 4,097,005.

BACKGROUND OF THE INVENTION

1. Field of the Invention

This invention relates to web transport systems and more particularly to a professional audio magnetic tape transport capstan control system.

2. Description of the Prior Art

Web transport control systems are utilized to control web member motion in a large number of systems ranging from heavy industrial applications such as steel rolling mills to motion picture film transports. Because of the more demanding requirements for extremely rapid acceleration, combined with precise velocity control, magnetic tape transports have particularly been the subject of a great deal of development work. Typically in these systems tape extends along a low inertia tape path from a supply reel through a supply buffer to recording transducers and a capstan and then through a take-up buffer to a take-up reel. The capstan engages the tape to provide bidirectional control of tape motion past the recording transducers in some or all modes of operation. In instrumentation recorders precision steady state speed control is emphasized while rapid and precise acceleration control is emphasized in digital tape transports.

Although use of larger capstans is not totally unknown, professional audio tape transports typically utilize a small diameter capstan such as the capstan motor shaft itself with a pinch roller insuring nonslip engagement with the tape. The small capstan, combined with substantial inertia permit good control over steady state recording velocities. However, for high speed shuttle operation the tape must be released from frictional engagement with the capstan and otherwise controlled. Acceleration to recording velocities typically takes about 3 seconds and consumes a considerable length of tape. While rapid acceleration has heretofore been considered less important in a trade-off against more precise speed control it is nonetheless an extreme inconvenience in some circumstances.

For example, if a radio station wishes to play a recorded message at a given time, the operator must insure that several inches of blank tape precede the recorded message, start the recorder several seconds before the actual message start time, and preposition the tape so that the recorded message reaches the read head at the given time but several seconds after the recorder is started. A miscalculation of timing or positioning can result in the beginning of the message being played too early or too late and it may even be garbled if the recorder has not established the proper tape speed as the message reaches the read head. Similar problems may of course be encountered in trying to record a message at a precise location on a tape.

SUMMARY OF THE INVENTION

A bidirectional professional audio magnetic tape transport in accordance with the invention for recording and reproducing audio information includes pairs of reels and tape loop tension arms positioned to supply and take up a length of web member or magnetic tape moving along a tape path. Record and reproduce transducer heads are positioned along the tape path and tape motion along the tape path is controlled by a single capstan which remains in constant frictional contact with the tape to control tape motion along the path in all operating modes.

The capstan has a moderate inertia and includes a knob extending therefrom which facilitates capstan rotation and hence tape positioning by an operator. However, the relatively large diameter of the capstan reduces capstan rotational velocity and the energy required to accelerate the capstan to play/record speeds is not excessive. This acceleration can typically be accomplished in 0.5 sec or less to allow an operation to treat the acceleration to nominal speed as being virtually instantaneous.

A D.C. permanent magnet capstan motor is coupled by direct connection to the capstan and controlled by a motor energization system. The motor energization system includes a digital tachometer providing motor position and velocity information, a motor drive amplifier circuit coupled to accelerate the motor at a rate proportional to a motion error signal applied thereto, a phase comparator circuit providing a first motion error signal in response to tachometer and reference information, a constant acceleration signal generator circuit providing a second motion error signal and a switching circuit coupled to apply either the first or second motion error signal to the motor drive amplifier.

Some special features of the motor energization system include use of a position error signal from the phase comparator as an acceleration control signal, switching between constant acceleration and position error control signals, circuitry for increasing the gain of the position error signal once nominal velocity is reached, a simple summing network to prevent high speed capstan motion from exceeding the capabilities of the reel motors and tension arm storage, and use of a combination of digital logic and analog signals to control tape motion in an economical yet accurate manner. This arrangement is especially important in that it permits rapid acceleration as well as extremely precise steady state speed control.

BRIEF DESCRIPTION OF THE DRAWINGS

A better understanding of the invention may be had from a consideration of the following detailed description, taken in conjunction with the accompanying drawings in which:

FIG. 2 is a block diagram and schematic representation of a capstan motor energization system for the tape transport shown in FIG. 1;

FIG. 3 is a schematic diagram representation of a digital tachometer circuit used in the energization system shown in FIG. 2;

FIG. 5 is a block and schematic diagram representation of a reel sense circuit used in the energization system shown in FIG. 2;

FIG. 6 is a schematic diagram representation of velocity logic used in the energization system shown in FIG. 2; and FIG. 7 is a schematic diagram representation of a compensation filter used in the energization system shown in FIG. 2.

DETAILED DESCRIPTION

Figure 1:
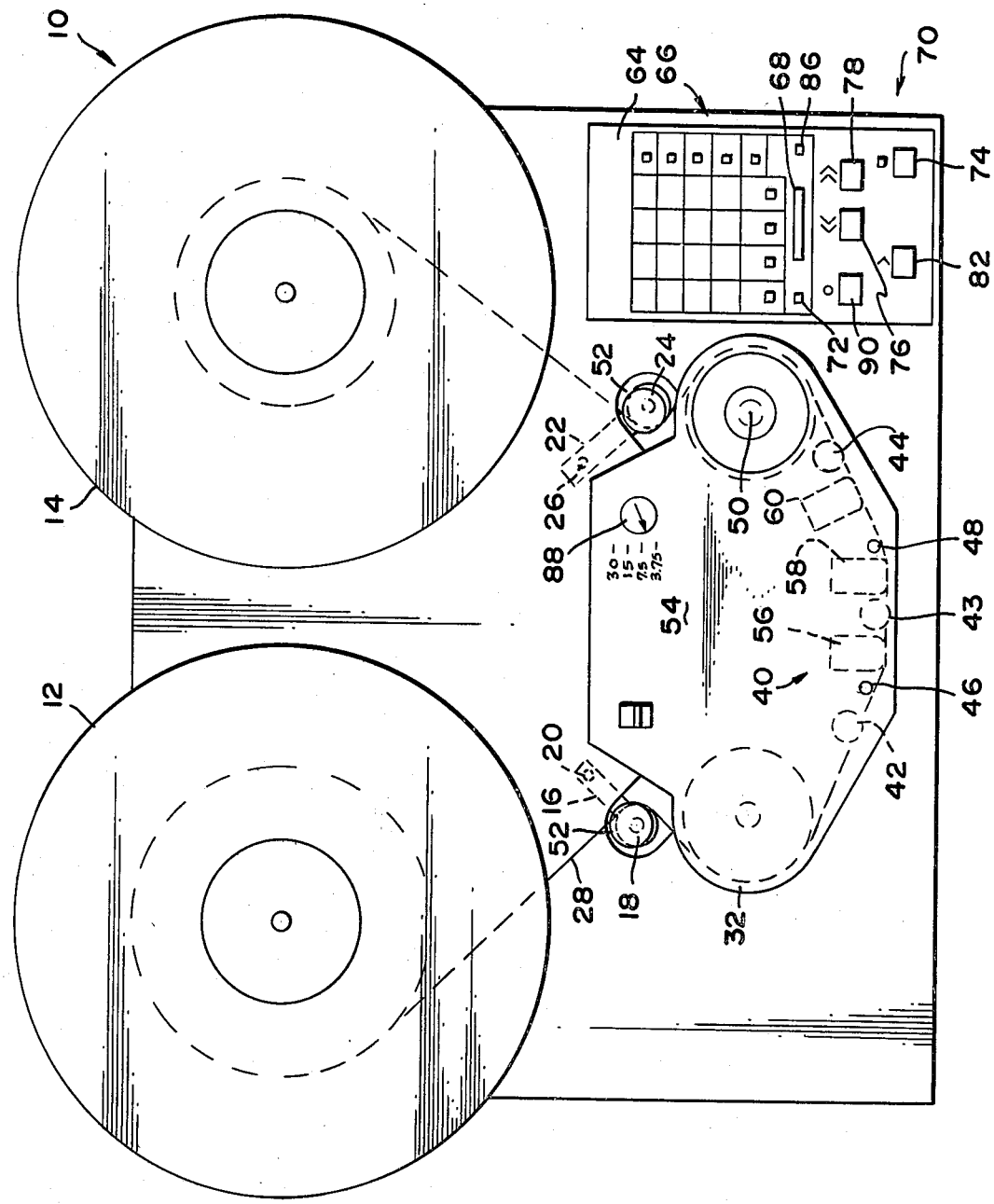
FIG. 1 is a front view of a professional audio tape transport in accordance with the invention.

Referring to FIG. 1, a professional audio magnetic tape transport 10 in accordance with the invention includes a supply reel 12, a take-up reel 14, a supply tape tension arm 16 having a tape guiding roller 18 at one end and mounted for rotation about a point 20 at an opposite end, and a take-up tape tension arm 22 having a tape roller 24 at one end and mounted for rotation about a point 26 at an opposite end. The reels 12, 14 and tension arms 16, 22 supply and take up a length of web member or magnetic tape 28 as it moves along a tape path 30 between the tension arms 16 and 22. Positioned along and defining the tape path 30 are an idler roller 32 which is positioned along the tape path adjacent the tape roller 18 and which activates a timer when rotating, a single, bidirection drive capstan 34 positioned along the tape path adjacent the tape roller 24, a self-guiding transducer head assembly 40, guides 42, 43, 44 positioned on opposite sides and center of head assembly 40 between idler roller 32 and capstan 34. Solenoid operated tape lifter arms 46, 48 are extended onto the tape path, during certain high speed shuttle operations to lift the tape 28 from the head assembly 40 and thereby reduce head wear. The capstan 34 has a cylindrical tape engaging and guiding circumference of a hard, non-resilient substance such as aluminum or preferably aluminum oxide with a diameter of approximately 2.375 inch (6.03 cm). While the exact diameter of the capstan 34 is not critical, it should be substantially larger than the 0.5 inch (1.27 cm) diameter capstan motor shaft capstans that are typical of present audio tape transports and preferably has a diameter of at least 1.5 inch (3.81 cm). The large diameter permits use of moderate capstan inertia for closer control over the nominal play speed without requiring large energy inputs for acceleration to nominal play speed or higher shuttle speeds. The large diameter of capstan 34 also enables the capstan 34 to control shuttle speed tape motion without requiring an excessive capstan motor speed. Rapid, controlled acceleration of tape 28 by capstan 34 is thus attainable in all modes. A knurled handle or knob 50 extends out of the plane of the tape path 30 to enable an operator to grip and control the motion of the capstan 34 during editing. A rotating capstan assembly including the capstan 34, knob 50, a capstan motor directly coupled thereto, a flywheel and a tachometer provide a total combined moderate inertia of approximately 0.15 inch-oz-sec$^2$.

The reels 12, 14 may be driven by suitable reel motors and reel servo control systems which are not shown in FIG. 1 while the tension arms 16 and 22 may be actively positioned with variable tape tension actively controlled by transducers and servo control circuitry not shown to control tape tension on opposite sides of the capstan 34 and thereby prevent tape slippage relative to capstan 34 notwithstanding the hard, low coefficient of friction surface and moderate wrap around angle of tape 28 about the capstan 34. Conventional means of preventing tape slippage about capstan 34 may also be employed. During a play edit mode of operation during which torque is removed from the reel 14, the roller 24 is moved into engagement with capstan 34 by proper positioning of tension arm 22 to permit it to operate as a pinch roller. The tape 28 is thus held in frictional engagement with the capstan 34 to permit the capstan to control tape motion along the tape path 30 even though tape tension is removed between the roller 24 and the reel 14. A pair of ceramic disk-shaped edge guides 52 are disposed adjacent the roller 24 on opposite sides thereof. The edge guides 52 are mounted eccentrically with respect to the axis of rotation of roller 24 to enable roller 24 to engage capstan 34 without interference.

A head cover 54 covers and protects the elements of the head assembly 40 which include an erase head 56, a write head 58, and a read head 60.

A control panel 64 includes an upper portion 66 containing play and record control switches for four channels of recording. A central section 68 contains a digital time display which indicates actual elapsed tape transport tape motion operating time after reset. A lower section 70 of control panel 64 contains the operator switches for controlling motion of the tape 28. These switches include a time reset switch 72 which merely resets to zero the elapsed time display of center section 68. A stop switch 74 stops all tape motion, a rewind switch 76 commands a high speed tape motion in a reverse or rewind direction, a fast forward switch 78 commands a high speed tape movement in a forward direction, a play switch 82 commands tape motion at a normal record or reproduce speed, and an edit switch 86 commands a special edit mode of operation. A rotary switch 88 permits selection of a desired play speed. Although other speeds could be implemented, audio tape transports typically record at speeds of 3.75, 7.5, 15 or 30 inches per second. Operator selection of tape speed at either 3.75, 7.5 ips, 15, or 30 ips, depends upon the positioning of switch 88. Simultaneous actuation of play switch 82 and a shuttle speed switch 76 or 78 commands operation at a speed of either 60 ips or 180 ips as determined at the time of manufacture to permit tape to be smoothly wound onto a reel at a uniform tape tension and uniform speed which is faster than the comparatively slow play/record speeds. In a rewind or fast forward mode of operation, tape speed is limited by the ability of the reel motors to keep up with capstan motion and therefore tape speed may vary somewhat and thus prevent uniform packing of tape on a reel. In addition, at these high speeds air tends to be trapped between adjacent layers of tape. A record switch 90 controls the energization of erase head 56 and write head 60 for channels that are enabled by the recording controls 66.

There are three different edit modes of operation which may be implemented with the edit switch 86 and an appropriate combination of other switches. In a stop edit mode of operation, the reel motors for reels 12 and 14 and the capstan motor for capstan 34 are all deenergized and permitted to rotate freely in response to operator manipulation. A stop edit mode of operation is implemented by depressing the edit switch 86 while motion stop is commanded. By pressing the play switch 82 and then edit switch 86, a play edit mode of operation is executed. In this mode of operation, the roller 24 engages capstan 34 to act as a pinch roller and reel 14 is stopped while the capstan 34 rotates at the selected play speed. Tape thus accumulates between the roller 24 and the take-up reel 14. The accumulated tape may be cut out, examined before manually rewinding on reel 14 or otherwise disposed of. Activation of the edit switch 86 after either the rewind switch 76 or fast forward switch 78 executes a fast edit mode of operation in which tape is moved by the capstan at a fast or shuttle speed while the tape lifter arms 46 and 48 are in a retracted position. This leaves the tape in contact with the transducer head assembly 40 to permit an operator to listen for an audible que as tape 28 is moved either forward or backward at a high rate of speed. Normally, during a high speed shuttle operation, the tape lifter arms 46 and 48 are extended by a solenoid to lift the tape 28 from the transducer head assembly 40 to prevent head wear during high speed operation.

Referring now to FIG. 2, there is shown therein a low inertia permanent magnet D.C. capstan drive motor 100 connected for energization by a motor energization system 102. Digital logic signals utilized in the control of the motor energization system 102 are provided by a control panel and logic circuit 104 which includes the control panel 64 and conventional logic circuitry (not shown) for buffering the operator switch signals to generate appropriate motion control signals. The control panel and logic circuit 104 operates to latch the push button operator switch signals and prevent simultaneous generation of inconsistent command signals. It should be noted that the tape transport is capable of changing directly from one speed or direction to another. For example, if the rewind switch 76 is actuated while the tape is moving in a forward play mode the tape direction is merely reversed without need to first stop the tape and then command a reverse direction.

The signals SSA and SSB are responsive to speed control switches and determine the synchronous operating speed of the tape transport. As noted previously, it is contemplated that only two of the four available states of these signals would normally be available in a particular tape transport 10.

Signal PEC is a play edit command signal which is generated by actuating the edit switch 86 while a play command is active. The 28.8 KHz signal is merely a squarewave reference clock signal. Signal STC is a stop command signal which is generated in response to actuation of stop switch 74. Actuation of stop switch 74 also terminates all other motion command signals. Similarly, the stop condition is terminated by initiating a motion command. Signal SPC is a spooling command signal which commands an intermediate but precisely controlled, rate of speed to permit tape to be uniformly wound onto a reel. Tape motion may be in either direction as determined by selective activation of the rewind switch 76 and fast forward switch 78 while a play mode is active and spooling tape speed is hardware determined at the time of manufacture to be either 60 ips or 180 ips. Signal INT S is an internal select signal which determines whether or not a squarewave speed reference signal is to be supplied internally or externally through a plug connection. When true, utilization of an internal reference signal is commanded. A signal DRFC is a direction forward command which determines the actual direction of tape motion. This signal is generated in response to the direction commanded by the various operator switches and commands forward tape motion when true and reverse motion when false. SHC is a shuttle command which is generated in response to actuation of rewind switch 76 or fast forward switch 78 to command high speed tape motion. PLC is a play command which commands synchronous speed control at the play/record speed determined by signals SSA and SSB. Signal 9.6 KHz is an internally generated squarewave velocity reference signal.

The control and reference signals generated by control panel and logic circuit 104 are utilized by the motor energization system 102 which contains a combination of digital logic and analog servo control circuitry to economically and precisely control capstan motor motion. The capstan motor 100 is energized by a motor drive amplifier circuit 110 which includes an inverting power motor drive amplifier 112 having an inverting input 114 coupled to form a summing junction and an output coupled to drive one armature terminal of the capstan motor 100. A noninverting input of motor drive amplifier 112 is coupled through a resistance to ground. The armature terminal of motor 100 opposite the output of amplifier 112 is coupled through a 0.33 ohm current sense resistor 116 to ground. The polarity of the armature terminals of motor 100 are selected such that a negative voltage at the output of amplifier 112 tends to rotate the capstan motor 100 so as to provide a forward motion for a tape member 28.

A first negative feedback path is coupled to cause the motor drive amplifier circuit 110 to operate as an acceleration control circuit and accelerate the capstan motor 100 at a rate proportional to the magnitude of a motion energization signal applied to the inverting input 114. The common point of resistor 116 and the armature of motor 100 is coupled through the parallel combination of a 24K resistor and a 0.01 microfarad capacitor to the inverting input 114 to provide a negative feedback signal to inverting input 114 proportional to capstan motor 100 current as sensed by resistor 116. High frequency filtering is provided by a 0.1 microfarad capacitor coupled between inverting input 114 and ground. Thus, motor drive amplifier circuit 110 operates to cause capstan motor 100 to be energized with a current of a magnitude proportional to the magnitude of a motion energization signal applied to inverting input 114. The torque produced by a permanent magnet D.C. motor is substantially proportional to the current through the motor and since the tape path frictional forces are relatively small and the elements which rotate as tape moves along the tape path 30 have a constant inertia, acceleration of a length of tape 28 along tape path 30 is linearly proportional to the current through motor 100. The motor drive amplifier circuit 110 thus operates to accelerate the length of tape 28 at a rate proportional to a motion energization signal applied to the inverting input 114 within a linear operating range of circuit 110.

A second negative feedback path in the form of back-to-back Zener diodes 118, 120 and a 3.3 K resistor coupled in series between the output and inverting input of motor drive amplifier 112 limits the maximum voltage magnitude which may be applied to the armature of motor 100. Since diodes 118 and 120 have a forward conduction threshold of about 0.6 volts and a reverse breakdown voltage of 12 volts, they will conduct a negative feedback signal to the inverting input 114 when amplifier 112 output voltage exceeds approximately 12.6 volts with either positive or negative polarity. Since the rotational speed of motor 100 is proportional to its back EMF, the Zener diode path operates to prevent energization of motor 100 for a rotational speed greater than that at which the back EMF equals 12.6 volts. In the present example, a maximum tape speed of approximately 520 ips is thus attained. This arrangement of motor drive amplifier 112 provides a simple, yet highly effective way of controlling tape motion for both constant, rapid, controlled acceleration throughout an acceleration interval and high speed shuttle operation. By applying a constant current to the inverting input 114, the motor drive amplifier circuit 110 is commanded to accelerate the motor 100 at a constant rate so long as the acceleration command is applied. However, if the constant acceleration continues for a sufficient period of time, the diodes 118 and 120 eventually operate to limit the maximum speed of the motor 100. Thus, the same acceleration command circuitry may be utilized to control both constant acceleration and high speed shuttle motion. While the diode limiting of speed does not provide the precise speed control provided for lower speed recording and reproducing, the speed control is more than adequate for fast forward and rewind operation during which it is merely desired to move tape from one point to another at a relatively high rate.

Four sources are available for providing motion error signals to the motor drive amplifier circuit 110 which are treated thereby as motor torque or acceleration command signals. An offset signal generator 124 includes a logic inverter gate 126 which receives signal $\overline{PEC}$ as an input and has its ouput coupled through a 1 K resistor to +5 volts and also through a 220 K summing resistor 128 to the inverting input 114 of amplifier 112. Under most circumstances, signal $\overline{PEC}$ is high, and the output of inverter 126 is at a low or ground potential so that it has substantially no affect upon the inverting input 114, which is maintained as a virtual ground. However, during a play edit mode of operation, the play edit command signal, PEC, is generated, causing signal $\overline{PEC}$ to go low and the output of inverter 126 to rise to +5 volts and provide a constant current to inverting input 114 which operates as a constant torque command. This constant torque is added to the normal control torque commands and operates to compensate for the tape tension differential force which appears across the capstan 34 as a result of deenergization of reel 14 while reel 12 remains energized.

A switching circuit or network 132 including field effect transistors 134 and 136 and associated control circuitry operates to apply a selected one of two motion energization signals input to the motor drive amplifier circuit 110 as an acceleration command. Field effect transistor 134 operates as a switch which is closed in response to an acceleration mode signal to couple a constant acceleration signal to the inverting input 114 as a motion energization signal. An NPN transistor 138 has an emitter coupled to ground, a base coupled through a resistor to the acceleration mode signal and a collector coupled to a gate electrode of FET transistor 134 and also through a resistor to +12 volts. Under most circumstances, the transistor 138 is nonconductive and the gate electrode of transistor 134 is thus maintained at +12 volts, causing transistor 134 to operate as an open switch. However, upon generation of an acceleration mode signal by a comparator circuit 140 transistor 138 is turned on, causing the collector of transistor 138 and the gate electrode of transistor 134 to approach ground potential and thereby cause transistor 134 to operate as a closed or conductive switch.

The constant acceleration signal that is selectively controlled by FET 134 is generated in response to a drive forward signal, DRF. Signal DRF is generated by direction logic 142 and indicates an energization drive direction. This signal is high to indicate a forward drive direction and low to indicate a reverse drive direction. Signal DRF is applied as the input to an inverter gate 144 whose output is coupled through a 6.2K resistor 146 to +5 volts and also through a 10K resistor 148 to a base electrode of a PNP bipolar transistor 150. The emitter of transistor 150 is connected to +5 volts and the collector is coupled through a 7.5K resistor 152 to −12 volts, through a 5.1K resistor 154 to ground, through a 27K summing resistor 156 to transistor switch 134 and through a 330K summing resistor 158 to transistor switch 136. Once signal DRF is high the output of gate 144 goes low to turn on transistor 150 and clamp the collector of transistor 150 at +5 volts. When signal DRF is low, the output of gate 144 is high and transistor 150 is turned off. The collector of transistor 150 is thus clamped at a voltage determined by the voltage divider action of resistors 152 and 154. In the present example, this voltage is approximately −4.85 volts. Thus, during an acceleration mode of operation when transistor 134 operates as a closed switch, a constant current of a polarity dependent upon commanded tape motion direction is applied through summing resistor 156 as a constant acceleration signal. This current commands a constant acceleration of tape 28 of approximately 60 inches per second squared throughout a start/stop acceleration interval. Similarly, a much smaller current is applied through resistor 158 to transistor 136 to act as a constant torque signal which is summed with a position error signal which operates as a primary motion energization command during a synchronous speed mode of operation. The current through transistor 158 helps compensate for the friction in the capstan motor 100 bearings and brushes. The current applied changes polarity with the commanded direction such that an aiding torque is applied to nearly compensate for frictional torque in the motor in the opposing direction.

The motor energization signal at input summing junction 114 is reduced by a reel limit signal generated by a reel limit sense circuit 160 and applied through a 4.7K summing resistor 162 to the summing junction 114 through a transistor switching network. The reel limit signal is applied at all times except when the capstan 34 is phase locked or has stopped. The switching network includes an FET transistor switch 164 and NPN transistors 166, 168. When the transport 10 is not in a phase locked condition as indicated by a high level inverted locked signal, $\overline{LKD}$, and tape is moving as indicated by a low level signal STOPPED (STP), the collector of transistor 166 is driven high to turn on transistor 168 and close transistor switch 164.

As explained in greater detail below, the reel limit signal has a polarity opposite the polarity of the constant acceleration signal through resistor 156 to tend to reduce the commanded acceleration rate of capstan motor 100. For operating in a phase locked mode at nominal reproduce or record speeds or at synchronous 60 ips or 180 ips spooling speeds, the reel limit signal remains quite small and is not connected to the motor drive amplifier 112. However, as the capstan is accelerated toward a high shuttle speed for an extended period of time, the tape tension arms may approach the limits of their buffer capacities and in response thereto the reel limit signal is increased to correspondingly reduce the magnitude of the acceleration rate command signal to a magnitude at which the reel motors can match the acceleration rate of the capstan motor 100 and prevent the tape tension arms 16, 22 from exceeding their tape storage capacities.

Similarly, while the capstan motor 100 is rotating at a high shuttle speed, the rotational speed of the reel motors must increase as the tape pack diameter decreases. Therefore, the reel limit signal is increased as reel velocity increases until the difference between the constant acceleration current through resistor 156 and the reel limit current through resistor 162 just matches the magnitude of current required to command a capstan motor 100 current which will maintain capstan motor 100 speed at a rate that can be matched by the reel motors.

Like transistor 134, transistor 136 operates in a switching mode and couples the sum of a position error signal and the torque adjustment signal through resistor 158 to inverting input 114 of amplifier 112. Transistor switch 136 is normally closed when operation at a synchronous play or spooling speed is commanded and actual tape speed is not less than commanded tape speed and a stop command has not been generated. The gate electrode of transistor 136 is coupled through a 47K resistor to +12 volts and also to the collector of an NPN transistor 169. The emitter of transistor 169 is connected to ground and the base is coupled through 6.2K resistor to +5 volts and is also connected to digital logic inverter gate 170 and a digital logic inverter gate 172. Logic inverter gate 170 has its input coupled to a signal $A = \overline{PLC} + STC$ while logic inverter gate 172 has its input coupled to an underspeed signal, US, which is active when actual capstan motor 100 speed is less than a commanded reference speed. Only when both of these input signals, US and A, are low is the transistor switch 136 closed to pass the position error signal to motor drive amplifier circuit 110 as a motion energization command signal.

Thus, when tape transport operation at a synchronous speed is commanded and actual speed is not less than the synchronous speed as determined by the underspeed signal, the speed of capstan motor 100 is controlled in response to a position error signal communicated through 56K summing resistor 180 and transistor switch 136. The position error signal is generated in response to a phase indicative position error signal, PIPE, which is generated by comparator 140 in response to a pulsed actual speed signal, PAP, from a digital tachometer 182 and pulsed positioned reference signal, PRP, from velocity logic 184.

A photo optical digital tachometer 152 responds to capstan motor motion by generating a motion sense signal, MTS, when capstan motor 100 is actually rotating, a tachometer direction signal, T, which is true or high when capstan motor 100 is rotating in a forward direction and false or low when the motor is rotating in a reverse direction, and an actual position signal, PA. Signal PA is approximately a symmetrical squarewave digital logic signal with each transistion thereof indicating an equal distance increment of motion of capstan motor 100. Signal PA thus carries accurate motor speed and incremental position information, but without reference to a position zero point. An EXCLUSIVE-OR gate 186 has one input directly connected to signal PA and a second input coupled through a low pass filter to signal PA to generate a pulsed actual position signal, PAP as a series of short pulses with each pulse being generated in response to a transistion of signal PA and hence representing an equal increment of rotational distance for capstan motor 100. In essence, EXCLUSIVE-OR gate 186 operates to double the frequency of the actual position signal to thereby double the effective sampling rate of comparator 140 and hence increase the time response rate of energization control system 102.

Velocity logic 184 receives motion commands from control panel and logic circuitry 104 as well as 28.8 KHz and 9.6 KHz digital clock signals. It generates the signal $A = \overline{PLC} + STC$ and a position reference signal, PR, which commands a constant reference of synchronous speed of motor rotation. The velocity logic 184 operates to generate the position reference signal as a digital logic signal commanding an increment of rotation of capstan motor 100 as indicated by the actual position signal for each transistion in the position reference signal. The frequency of the position reference signal is thus indicative of a reference speed for tape motion. The position reference signal is generated only when motion is commanded at one of the synchronous play or spool tape motion speeds with the proper frequency being selected by velocity logic 184. An EXCLUSIVE-OR gate 188 operates in a manner similar to EXCLUSIVE-OR gate 186 to generate a pulsed position reference signal having a short positive pulse for each transition of the positioned reference signal from velocity logic 184.

In addition to the signal phase indicative position error signal, PIPE, comparator 140 generates several speed indicative signals which are utilized by the motor energization system 102. A latched overspeed signal, OSL, is generated when capstan motor 100 rotates faster than a speed commanded by the position reference signal and underspeed signal, US, is generated when capstan motor 100 rotates slower than the speed commanded by position reference signal, PR. The complement of a locked signal, LKD, is generated to indicate whether or not actual speed of capstan motor 100 equals the speed commanded by the position reference signal, PR. The locked signal is generated in the absence of both the overspeed signal, OSL, and the underspeed, US. The complement of a compensated locked signal, LKDC, is generated by comparator 140 for use elsewhere in the tape transport. The compensated locked signal is similar to the locked signal, except signal LKDC continues to indicate a locked position until signal OSL or signal US has been present for approximately 5 seconds. The acceleration mode signal is generated by comparator 140 to command that the motor drive amplifier circuit 110 operate in response to constant acceleration commands. An ACCELERATION MODE signal is generated when signal US is present, when a high speed shuttle mode operation is commanded, or when motion stop has been commanded but the capstan motor 100 is still rotating. It thus controls (1) acceleration toward a commanded synchronous speed, (2) acceleration toward and operation at a high shuttle speed, and (3) deceleration toward stop.

The phase indicative position error signal, PIPE, is also generated by comparator 140 as a digital logic type of signal which indicates the phase relationship between signal PAP and signal PRP by relative time durations of high and low signal levels. If the pulses of signals PAP and PRP occur at the same rate, but alternately with the same time interval between successive pulses, signal PIPE will be a symmetrical squarewave signal. However, as the phase relationship between signal PAP and PRP changes, the relative time durations of the high and low states change accordingly.

During an underspeed condition signal PIPE saturates at a D.C. level of approximately +5 volts, and in response to an overspeed condition signal PIPE rapidly saturates at a D.C. level of approximately 0 volts. It is only over a phase locked speed range at which one pulse of signal PAP occurs for every pulse of signal PRP that signal PIPE operates in a linear range to control capstan motor current and hence torque in linear proportion to a deviation of signals PAP and PRP from a 0 error reference phase relationship. Within the linear range, signal PIPE is thus a very precise position error signal tending to drive capstan motor 100 such that rotational increments and hence the rotational speed thereof exactly match, the rotational increments and rotational speed commanded by the pulsed position reference signal, PRP.

An EXCLUSIVE-OR gate 190 receives the signal, PIPE, as one input and the drive forward signal, DRF, as a second input. EXCLUSIVE-OR gate 190 thus operates as a simple, precise, selective polarity inverter of signal PIPE, which is a digital signal containing continuously variable or analog position error information as indicated by the relative time durations of high and low signal intervals. The output of EXCLUSIVE-OR gate 190 is applied to a carrier filter 192 which extracts the low frequency and D.C. component or average signal level from the digital logic signal generated by EXCLUSIVE-OR gate 190 and provides voltage level translation to output a position error signal, PE, having a polarity and magnitude that varies with the actual average voltage of the output signal from EXCLUSIVE-OR gate 190, but a zero magnitude when signals PAP and PRP have approximately a mutual phase relationship of 180° relative to each other. This will of course occur when there is a relative phase relationship of approximately ±90° between signal PR and signal PA.

Signal PE is coupled to summing resistor 180 through a compensation network 194. Signal PE is coupled through a 4.7K resistor and then a 330K resistor to an inverting input of a high voltage gain operational amplifier 196. A 0.047 microfarad capacitor is connected in parallel with the 330K resistor. The noninverting input of amplifier 196 is coupled to ground through the parallel combination of a 0.01 microfarad capacitor and a 240K resistor. The output of amplifier 196 is coupled through the parallel combination of a 0.01 microfarad capacitor and a 47K resistor to summing resistor 180. The output of amplifier 196 is also connected in a first feedback loop through a pair of oppositely oriented, series connected Zener diodes 198, 200 to the inverting input. Diodes 198 and 200 have a reverse breakdown voltage of approximately 8.2 volts and a forward conduction threshold voltage of approximately 0.6 volts so that the output voltage of amplifier 196 is clamped between approximately ±8.8 volts. These diodes operate to limit the maximum acceleration that can be commanded when motion is controlled by the position error signal and also ensure that the maximum acceleration is the same for both directions of energization not withstanding any inequalities in the saturation magnitudes of signal PE from the compensation filter 192 at different polarities.

A second negative feedback path for amplifier 196 determines the D.C. gain for compensation circuit 194. The second negative feedback path includes a 180K resistor 202 having one terminal connected to the output of amplifier 196 and an opposite terminal coupled to the inverting input of amplifier 196 through the parallel combination of a 0.082 microfarad capacitor 204, a one meg resistor 206, and an FET transistor 208.

The gate electrode of transistor 208 is connected through a 47K resistor to +12 volts and is also connected to the collector of an NPN transistor 214. The emitter of transistor 214 is connected to ground and its base is coupled through a 10K resistor to underspeed logic signal, US.

When capstan motor 100 is in an underspeed condition, signal US is high to turn on transistor 214 and effectively close FET transistor switch 208. Notwithstanding the fact that actual motion control of capstan motor 100 may be provided by the constant acceleration signal through summing resistor 156. Under this nonphase locked condition, resistor 210 is coupled in parallel with resistor 206 and the total feedback resistance is comparatively low to provide a comparatively low voltage gain across the compensation circuit 194. As capstan motor 100 reaches synchronous or phase locked speed, signal US goes low to open FET switch 208 and increase the resistance coupling the output of amplifier 196 to its inverting input and hence the gain across compensation network 194. Compensation network 194 thus provides a comparatively high gain when the tape transport 10 is in a phase locked condition wherein actual speed of capstan motor 100 is equal to or above a commanded reference speed. The opening of transistor switch 208 also has the effect of tending to increase the lag compensation of compensation circuit 194 provided by capacitor 204. Thus, in a phase locked condition, compensation circuit 194 provides the signal PE with a higher gain but with a low frequency phase lag.

As an example, consider what happens as an operator activates a play switch while the tape transport is in a stop condition. The control panel and logic circuit 104 responds to this switch actuation by generating a play command, PLC, and a direction forward command, DRFC. Signals SSA and SSB are continuously generated at predetermined logic levels to indicate the synchronous play tape speed, signal INT S is generated to command use of internal clock signals and the clock signals 9.6 KHz and 28.8 KHz are continuously generated. Velocity logic 184 responds to the play command signal by generating the position reference signal at an appropriate frequency. Since this frequency is initially much higher than the frequency of signal PA from digital tachometer 152, the comparator 140 almost immediately senses an underspeed condition to generate signal US and to generate signal PIPE in a saturated high level logic state. At the same time, direction logic 142 responds to the direction forward command by generating a high level or true direction forward signal, DRF to command energization of capstan motor 100 for forward motion. The underspeed signal causes an acceleration mode signal to be generated by comparator 140 to close transistor switch 134 and permit the constant acceleration signal, as generated in response to signal DRF, to be communicated to the motor drive amplifier circuit 110 to command constant acceleration of capstan motor 100 in the forward direction. The underspeed signal is also communicated through inverter gate 172 to open transistor switch 136 and prevent the position error signal, PE, from influencing capstan motor operation during the acceleration interval. Also during this acceleration interval, signal US is high to close transistor switch 208 and switch compensation circuit 194 to a comparatively low gain, no phase lag condition. Under these circumstances, the output of amplifier 196 responds rapidly as signal PE comes out of saturation when the actual speed of motor 100 reaches commanded reference speed. Under this circumstance, the compensated position error signal provided to summing resistor 180 closely corresponds to the actual position error as indicated by signal PIPE. The decreased gain of the compensation circuit 194 maintains stability of its output without integration from capacitor 204.

As actual speed of motor 100 reaches the reference speed, a phase locked condition comes into existence, with the ACCELERATION MODE signal, signal $\overline{\text{LKD}}$ and signal US going low. These signals open transistor switch 134 and close transistor switch 136 to switch motion control from the constant acceleration signal to the position error signal provided through summing resistor 180. At the same time, transistor switch 208 is opened to increase the gain and place integration in the compensation circuit 194.

The capstan motor 100 is thus accelerated at a rapid, constant rate to synchronous speed with the acceleration actively controlled with motor current feedback throughout the acceleration interval. Motion control is then switched to a highly precise increased gain, phase locked position error control. If the compensation circuit 194 remained in its high gain state during the acceleration interval, the integration would delay the output of amplifier 196 from adjusting to the sudden occurrence of the phase locked condition and a substantial overspeed would occur before the output of amplifier 196 could adjust and cease commanding a rapid acceleration. On the other hand, if the compensation circuit 194 always remained in its lower gain state, the speed of capstan motor 100 would follow the commanded speed with somewhat greater error at steady state and low frequency perturbations and the extremely precise steady state speed control provided by the higher gain would not be realized.

However, by switching between constant acceleration and phase locked modes while switching the gain of compensation circuit 194, the best of all control modes is realized. As synchronous speed is reached, the low gain state of compensation circuit 194 permits the output of amplifier 196 to rapidly approach zero volts so that as compensation circuit 194 is switched to its high gain state, the output of compensation circuit 194 indicates a small error and the speed overshoot problem is avoided while immediately providing a high gain, low error precise speed control.

Referring now to FIG. 3, the digital tachometer 182 includes a pair of light emitting diodes 220, 222, positioned on one side of a capstan motor 100 mounted optical encoding disk 224 and a pair of photosensitive transistors 226, 228 positioned on an opposite side of disk 224 opposite diodes 220 and 222 respectively. Disk 224 contains alternate transparent and opaque regions of equal length disposed near its circumference to alternately pass light from light emitting diodes 220 and 222 to transistors 226 and 228 as disk 224 rotates. The collectors of transistors 226 and 228 are coupled through a resistor to +12 volts and through capacitors to ground to provide a stabilized power source for the transistors. The emitters of transistors 226 and 228 are coupled through resistances to −12 volts and thus provide A.C. signals as the alternate opaque and transparent areas of disk 224 alternately pass and intercept light from the diodes 220, 222. The diodes 220, 222 and their opposed phototransistors 226, 228 are positioned with respect to the alternate opaque-transparent pattern of disk 224 such that when the capstan 34, capstan motor 100, and disk 224 combination are rotating together in a forward direction, the A.C. output from the emitter of transistor 226 leads the A.C. output from the emitter of transistor 228 by approximately 90°. The A.C. signal from the emitter of transistor 226 is coupled through a pulse shaping and squaring circuit 230 including operational amplifier 232, NPN transistor 234, and logic inverter gate 236. A capacitor 238 is coupled in series with a resistor 240 to provide positive feedback from the collector of transistor 234 to an inverting input of amplifier 232. This positive feedback provides a small amount of hysteresis across the shaping and squaring circuit 230 and also tends to increase the steepness of rising and falling edges during transitions between different signal levels. The output of inverter gate 236 is coupled to an edge triggered clock input of a D-type flip-flop 242. The sharp transition edges and triple inversion provided by shaping circuit 230 insures that upon occurrence of a decreasing voltage for the A.C. signal from transistor 226, flip-flop 242 is triggered with a sharp rising edge.

A second pulse shaping and squaring circuit 244 includes an operational amplifier 246, an NPN transistor 248, and a pair of logic inverter gates 250, 252 having their inputs connected to the collector of transistor 248. Pulse shaping circuit 244 similarly provides triple inversion. Thus, at the occurrence of a decreasing voltage at the emitter output of transistor 226, when the capstan motor 100 is rotating in a forward direction, the signal output from the emitter of transistor 228 is at a relatively high level and the triple inversion of shaping circuit 244 produces a logical false or low signal at the output of inverter gate 250. This output is coupled to the D input of flip-flop 242 so that each time flip-flop 242 is clocked by the rising edge of a signal from inverter gate 236, while the capstan motor 100 and disk 224 rotating therewith are rotating in a forward direction, flip-flop 242 becomes reset. In the event that the capstan motor 100 and disk 224 are rotating in a reverse direction, flip-flop 242 becomes set each time it is clocked by the shaped signal output by inverter gate 236. Flip-flop 242 thus indicates the direction of actual capstan motor 100, tachometer disk 224, capstan 34 and tape 28 motion. A tachometer direction signal, T, is taken from the $\overline{Q}$ output of flip-flop 242 to indicate motion in a forward direction when true and its complement, $\overline{T}$, is taken from the Q output of flip-flop 242.

The output of inverter gate 236 is also coupled to a trigger input of a retriggerable one-shot multivibrator 254 having a $\overline{Q}$ output coupled to provide a motion signal, MTS. One-shot multivibrator 254 is arranged to time out in approximately 3 milliseconds with the $\overline{Q}$ output remaining low so long as a pulse occurs at the output of inverter gate 236 at least once every 3 milliseconds. This corresponds to a tape motion speed of approximately 0.5 ips. Thus, when signal MTS is low or false it indicates that tape is moving at a speed of at least 0.5 ips without regard to direction of motion. Pulse shaping circuit 244 provides the actual position signal, PA, at the output of inverter gate 252. Signal PA is substantially identical to the signal output by inverter gate 250. To insure that the signal transition points in signal PA accurately represent the zero crossover points for the A.C. tachometer signal from the emitter of transistor 228, the noninverting input of operational amplifier 246 is clamped one diode forward conduction threshold voltage drop above ground. This is accomplished by connecting a forward conducting diode 256 through a current limiting resistor 258 to +5 volts. The anode of diode 256 is coupled through resistor 260 to the noninverting input to amplifier 246 and thereby shift the virtual ground at the inputs of amplifier 246 to a voltage level of approximately 0.6 volts. The output of amplifier 246 is coupled through a resistor 262 to the base of transistor 248 which has its emitter coupled to ground. Since the switching turn on-turn off voltage level of transistor 248 is one diode forward conduction threshold voltage level above ground or approximately 0.6 volts, the zero voltage polarity change point for the input of amplifier 246 nearly matches the zero voltage polarity change point for transistor 248, and the voltage at the collector of transistor 248 accurately represents the zero voltage crossover points for the A.C. signal output by the emitter of transistor 228. If the positive input of amplifier 246 were actually clamped to ground, as the A.C. signal output at the emitter of transistor 228 went through its zero crossover point, in a low to high direction, the output of amplifier 246 would be at zero volts. This would mean that transistor 248 was already turned off prior to the A.C. input signal reaching the zero crossover point. Similarly, in response to a high to low crossover for the input signal, the output of amplifier 246 would reach zero volts at the crossover point and a further time delay would be required to enable the input to amplifier 246 to become somewhat negative to enable the output to reach a positive 0.6 volts and turn on transistor 248. By clamping the virtual ground level at the input of amplifier 246 at the threshold switching level of transistor 248, this asymmetry in the actual position signal is eliminated. The transitions in signal PA thus more accurately represent the zero crossover levels from the A.C. tachometer signal at the emitter of transistor 228 to permit both positive and negative transitions of signal PA to be utilized as incremental position references. This effectively doubles the sampling frequency of comparator 140 to greatly improve the speed control accuracy of motion energization system 102 and eliminates amplitude modulation of the tachometer signal from being interpreted as phase or position errors.

Figure 4:
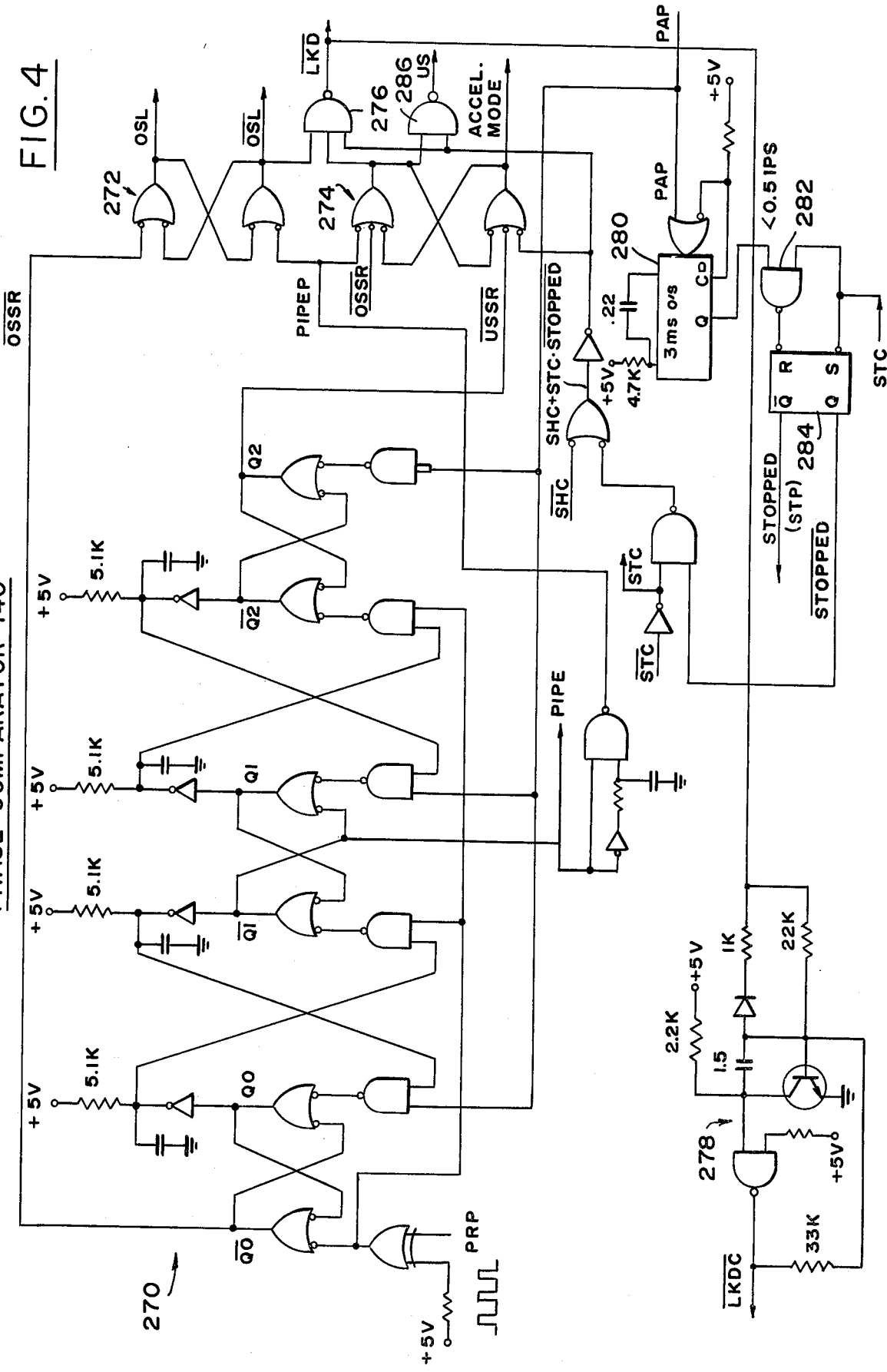
FIG. 4 is a schematic diagram representation of a phase comparator circuit used in the energization system shown in FIG. 2.

Referring now to FIG. 4, the phase comparator 140 is shown as including a 3 bit shift right/shift left/shift register 270. Shift register 270 is arranged to shift left 1 bit position with a logic 1 being input at the right in response to each pulse from the pulsed actual position signal, PAP, which indicates motion increments of the digital tachometer 182. Similarly, shift register 270 is connected to shift right one position with a logic 0 being entered at the left in response to each pulse from the pulsed position reference signal, PRP. The states logic 1 and logic 0 are used with reference to the Q outputs, Q0, Q1 and Q2 of the three stages of the 3 bit shift register 270.

If a forward motion reference command, for instance an operator play command, is received while the tape transport 10 is in the stopped condition, velocity logic 184 immediately begins to generate pulses on signal PRP at a predetermined reference frequency. However, because at the instant the play command is received, the capstan motor 100 is not rotating, there will initially be no pulses occurring on signal PAP and the pulse rate will gradually increase from zero to a rate equal to the frequency of pulses on signal PRP as capstan motor 100 accelerates toward the synchronous speed. Thus, zeros will initially be shifted right through the shift register 270 with all three stages being set to the zero state.

Occasionally a logic 1 will be shifted into the bit position Q2, but position Q2 will immediately be shifted back to logic 0 at the next occurrence of a pulse on signal PRP. Therefore, during an acceleration interval, zeros are initially shifted into all bit positions of register 270 with a logic 1 being occasionally shifted into position Q2. As the capstan motor 100 accelerates toward synchronous speed, a logic 1 is shifted into position Q2 more and more frequently until position Q2 alternates between logic 0 and logic 1 upon occurrence of alternate pulses on signals PRP and PAP respectively. However, the arrangement of the comparator circuit 140 is such that the energization control system 102 does not switch from an acceleration control mode to a position error control mode until the capstan motor 100 accelerates to a speed slightly greater than synchronous speed to cause the occurrence of two pulses in succession on signal PAP without an intervening pulse on signal PRP. The first pulse shifts a logic 1 into position Q2 and the second pulse shifts a logic 1 into position Q1. Upon the occurrence of a logic 1 at Q1, the motion energization system 102 immediately shifts from the acceleration mode to a position error mode and the capstan motor 100 is rapidly decelerated to synchronous speed to cause the occurrence of alternate pulse signals on signals PRP and PAP. These alternate signals cause bit position Q1 to alternately switch between state logic 0 and logic 1 respectively. While at stready state synchronous speed, bit position Q0 remains continuously at logic 0 while bit position Q2 remains continuously at logic 1. The slight overspeed condition required for the generation of two pulses in a row on signal PAP without an intervening pulse on signal PRP is so slight, and the time period required for recovery is so short, that no appreciable overshoot in tape speed occurs.

While operating at phase locked synchronous speed, bit position Q1 continues to change states at each alternate occurrence of pulses on signal PRP and signal PAP. If these signals are spaced equally in time for one another, the Q1 output of register 270 will have approximately equal high state and low state time durations. This corresponds to an approximately zero position error condition. However, if the actual instantaneous speed of motor 100 increases slightly, the phase lag of the signal PAP pulses will decrease with respect to the signal PRP pulses and the Q1 output will tend to have a shorter logic 0 time duration and a longer logic 1 time duration. This will increase the average D.C. level of the output Q1 and thereby create a position error signal which will tend to reduce the speed of capstan motor 100 until the zero error reference position relationship is reestablished . In order to establish the proper polarity of the digital position error signal, the phase indicative position error signal, PIPE, is actually taken as the $\overline{Q1}$ output of shift register 270, which is the complement of output Q1. A NAND gate 264 is coupled to the signal PIPE to provide a pulsed position indicative position error signal, PIPEP, which is normally high, but has a short logic 0 pulse for each low to high transition of signal PIPE. An underspeed shift register signal, $\overline{USSR}$, is taken from the Q2 output of shift register 270 and an overspeed shift register signal, $\overline{OSSR}$, is taken from the $\overline{Q0}$ output of shift register 270. A first latch 272 has its set input coupled to signal $\overline{OSSR}$ to be set in response to an overspeed condition and its reset input coupled to signal PIPEP, to be reset upon return to a phase locked, synchronous speed condition. The latched overspeed signal, OSL, is taken from the Q output of latch 272 and its complement, $\overline{OSL}$, is taken from the $\overline{Q}$ output of latch 272. A second latch 274 has a first set input coupled to signal $\overline{USSR}$ and a second set input coupled to be set in response to the logical relationship $$SET\ 2 = SHC + STC \cdot \overline{stopped}$$

The signal PIPEP is coupled to a first reset input of latch 274 to reset latch 274 upon the occurrence of a phase locked, synchronous speed condition and signal $\overline{OSR}$ is coupled to a second reset input of latch 274 to reset latch 274 upon the occurrence of an overspeed condition.

The acceleration mode signal is taken from the Q output of latch 274 and thus goes true upon and throughout the occurrence of the underspeed shift register signal or a shuttle command signal commanding a high speed tape motion, or a stop command while the capstan motor 100 and tape 28 have not yet stopped. The acceleration mode is thus commanded for acceleration to synchronous speed, fast forward, rewind, and deceleration from synchronous speed. In the event that actual speed of capstan motor 100 exceeds a commanded synchronous speed, the signal PIPE rapidly saturates at its maximum value to drive capstan motor speed back down toward synchronous speed. Capstan motor control remains in the position error mode during such an overspeed condition.

A NAND gate 276 has a first input coupled to receive signal $\overline{OSL}$, a second input coupled to receive signal $\overline{ACCELERATION\ MODE}$ and a third input coupled to receive the second set signal for latch 274. Signal $\overline{LKD}$ is generated at the output of NAND gate 274. This is the complement of a locked signal which indicates that the tape transport 10 is operating in a phase locked, synchronous speed condition.

Signal $\overline{LKD}$ is also coupled through a compensation network 278 which generates a compensated locked signal, $\overline{LKDC}$, as an output in response thereto. Signal LKDC is coupled to an operator warning indicator. It is compensated such that it almost immediately indicates a synchronous speed locked condition but indicates an unlocked condition only after that condition has persisted for a short period of time. In this way, the warning indicator is not activated every time a slight overspeed or underspeed condition occurs which is rapidly corrected.

The pulsed actual position signal, PAP, is connected to a reset input of a 3 millisecond one-shot retriggerable multivibrator 280. A $\overline{Q}$ output of one-shot multivibrator 280 provides a logical true or high output signal so long as capstan motor 100 is rotating at a speed sufficient to provide a tape motion of approximately 0.5 ips or more. A NAND gate 282 receives the motion signal from the $\overline{Q}$ output of one-shot 280 as one input and the stop command signal, STC, as a second input. The output of NAND gate 282 is connected to the inverting RESET input of an RS flip-flop 284 and signal STC is connected to an inverting SET input of flip-flop 284. The Q output of flip-flop 284 thus provides the complement of a motion stop signal, $\overline{STOPPED}$, which indicates that tape has been moving while a stop command, STC, was generated and the stop command has not been subsequently terminated. Since the control panel and logic circuit 104 terminates generation of the stop command upon termination of motion of capstan motor 100 as indicated by signal MTS, a flip-flop 284 is SET upon deceleration of the tape 28 below a speed of 0.5 ips. This is slow enough to permit and thereby terminate an acceleration mode of operation to prevent energization of the capstan motor while it is in a commanded stop condition. The 0.5 ips speed is sufficiently low that capstan motor and tape path friction rapidly terminate capstan motor rotation below this speed.

A NAND gate 286 receives signals $\overline{ACCELERATION\ MODE}$ and the second set signal for latch 274 to generate an underspeed signal, US, when the transport 10 is in an acceleration mode and an overspeed condition does not exist.

Referring now to FIG. 5, the speed logic 184 includes a first set of logic gates 290 which are connected to generate the position reference signal, PR, by selecting between a spooling reference frequency signal 292 and a play reference frequency signal 294. A NAND gate 296 is enabled to pass a spooling reference frequency signal 292 in response to a spooling command, SPC. Similarly, a NAND gate 298 is enabled to pass the play reference frequency signal 294 in response to the absence of a spooling command as indicated by signal $\overline{SPC}$. A purchaser option permits the spooling frequency to be hardwire selected to be either a 28.8 KHz reference frequency providing a spooling speed of 180 ips or a 9.6 KHz reference frequency providing a spooling speed of 60 ips.

A 4 bit counter 300 provides four play reference frequency signals as outputs which are all communicated to speed select logic 302 with only one of the signals being selected as the play reference frequency signal 294 by command speed select logic 302. Counter 300 has a RESET input which is activated in response to the logical function $$A = \overline{PLC} + STC$$

This reset signal constrains the outputs to be continuously logic 0 and hence command no reference speed in the absence of a play command or in the presence of a stop command.

Logic circuit 304 operates to apply a selected squarewave reference signal as a clock input to counter 300, in response to the internal select signal, INT S. If the internal select signal is high, a 9.6 KHz squarewave signal is gated to the clock input. This is an internally generated signal and would normally be the signal from which the play reference frequency signal is derived. However, in response to a logic 0 internal select signal, an externally supplied reference signal may be gated through a buffer 306 which prevents damage to internal logic circuitry to the clock input of counter 300. Counter 300 divides the clock input by 2, 4, 8 and 16 to provide an operator selectable range of play speeds. Speed select logic responds to these play speed reference signals as well as the speed select signals, SSA and SSB, to generate the play reference frequency signal having the logical function PLAY
REF = SSA·SSB·CK/16 + SSA·$\overline{SSB}$·CK/4 + $\overline{SSA}$·SSB·CK/8 + $\overline{SSA}$·$\overline{SSB}$·CK/2

These four terms of the play ref signal command speeds of 3.75 ips, 15 ips, 7.5 ips, and 30 ips respectively when counter 300 is clocked with the 9.6 KHz reference signal.

The direction logic 142 may be advantageously implemented in accordance with the logic function $$\mathrm{DRF} = \overline{\mathrm{T}} \cdot \mathrm{STC} + \overline{\mathrm{STC}} \cdot [\mathrm{T} \cdot \mathrm{OSL} \cdot (\overline{\mathrm{A}} + \mathrm{SPC}) + \overline{\mathrm{OS}} \cdot \mathrm{L} \cdot \mathrm{DRFC} + (\overline{\mathrm{A}} + \overline{\mathrm{SPC}}) \cdot \mathrm{DRFC}]$$

Where $\mathrm{A} = \overline{\mathrm{PLC}} + \mathrm{STC}$

Making the proper substitution for A and simplifying terms, this may be rewritten as $$\mathrm{DRF} = \overline{\mathrm{T}} \cdot \mathrm{STC} + \overline{\mathrm{STC}} \cdot [\mathrm{T} \cdot \mathrm{OSL} \cdot (\mathrm{PLC} + \mathrm{SPC}) + \overline{\mathrm{OS}} \cdot \mathrm{L} \cdot \mathrm{DRFC} + \overline{\mathrm{PLC}} \cdot \overline{\mathrm{SPC}} \cdot \mathrm{DRFC}]$$

The drive forward signal, DRF, thus operates to control the direction of energization for capstan motor 100 in accordance with the logic function stated above. The term $\overline{\mathrm{T}} \cdot \mathrm{STC}$ operates only in response to a stop command to command a motor energization direction which is opposite to the direction in which the capstan motor 100 is always rotating. It will be recalled that the motor energization system 102 automatically enters a constant acceleration mode upon generation of the stop command signal. The capstan motor 100 is thus automatically decelerated at a constant acceleration rate in responses to a stop command signal.

The terms within the brackets become operative to control capstan motor energization direction in the absence of a stop command signal as indicated by the term $\overline{\mathrm{STC}}$. The first term within the brackets operates to prevent speed runaway of capstan motor 100 in the event that it reaches an overspeed condition in the wrong direction. For example, suppose a normal play command were indicated by an operator and the capstan 34 were manually twirled or otherwise manipulated to accelerate the capstan 34 and capstan motor 100 to a speed greater than the synchronous play speed but in the reverse direction. This would normally cause a speed runaway condition. This would occur because the direction logic would be commanding forward motion energization when referenced to an underspeed condition, but the bipolar nature of the phase indicative position error signal, PIPE, from comparator 140 would result in this energization direction actually being reversed in the event of an overspeed condition. If the motor 100 were properly rotating in the forward direction, this reverse direction drive would then tend to slow the motor down to synchronous speed. But if the motor 100 were rotating above synchronous speed in the wrong direction, this reverse energization would merely tend to accelerate the motor 100 in the reverse direction. This first term within the brackets thus becomes effective when motion at one of the synchronous speeds is commanded and an overspeed condition exists, to command energization of motor 100 to decelerate it toward the synchronous speed because of the polarity reversal inherent in signal PIPE. As the motor 100 decelerates to synchronous speed while operating in the wrong direction, synchronous motion control is reestablished for an instant, but because the motor is rotating in the wrong direction, the synchronous control operates in an unstable positive feedback condition. However, because of the nature of the shift register 270 within comparator 140, it will be recalled that the capstan motor 100 must be decelerated slightly below synchronous speed to enable two reference pulses in a row to be generated before signal PIPE becomes effective to control motor velocity. Since actual speed will then be below synchronous speed, the synchronous speed control will operate in this unstable state to further decelerate capstan motor 100 for an instant until an underspeed condition is indicated. The underspeed condition will cause the motion energization system 102 to switch to an acceleration mode and the capstan motor 100 will undergo constant acceleration as it decelerates in the reverse direction toward zero velocity and then accelerates in the forward direction to the commanded synchronous speed. A speed runaway situation which is frequently a problem with systems having a digital tachometer and digital logic motion control is thus simply and economically prevented by the convenient direction logic and mode switching control provided by the motion energization system 102. It will be appreciated that the motion energization system 102 operates in a similar manner to prevent speed runaway in the forward direction when a synchronous speed in the reverse direction is commanded.

The last two terms within the brackets require that the drive forward signal indicate a desired motion direction as indicated by signal DRFC when there is no overspeed condition or when a speed other than a phase locked synchronous speed is commanded. In the present example this would imply only a high speed shuttle in either the forward or reverse direction. The center term in the brackets is effective to determine the logic state of the drive forward signal for operation at phase locked, synchronous speed regardless of whether or not a synchronous speed command switches the motion energization system 102 into a synchronous position error mode of speed control. Under all other circumstances, the last two terms within the brackets are effective only during an acceleration mode of control wherein the capstan motor 100 is energized for acceleration in the direction determined by signal DRF without the possibility of the energization direction being reversed by comparator 140.

Referring now to FIG. 6, the reel sense circuit 160 operates in response to average armature voltage of a take-up reel motor 320 and a supply reel motor 322 as well as tension arm position indicators to generate a reel limit signal which is summed with the constant acceleration signal through summing resistor 162 to tend to reduce the acceleration of capstan motor 100 so as to prevent the motion of tape 28 from exceeding the abilities of reel motors 320, 322 to take-up and supply tape. A take-up motor control 324, which may be conventional in nature operates to control motion of take-up reel motor 320 in response to a take-up tension arm position signal while supply motor control 326 operates to control the motion of supply reel motor 322 in response to a supply tape tension arm position signal.

The armature of take-up reel motor 320 is simply coupled through a 1.5 M summing resistor 308 to a summing junction 310 at an inverting input of an operational amplifier 312. Similarly, the armature of supply reel motor 322 is coupled through a 1.5 M summing resistor 314 to summing junction 310. The output of amplifier 312 is coupled through a lead compensation network 316 having a 39K resistor connected in parallel with the series combination of 2.68 microfarad capacitors to provide the reel limit signal. A 130K resistor, a 0.01 microfarad capacitor, and an FET transistor switch 328 are all coupled in parallel between the output of amplifier 312 and summing junction 310 to provide proper compensation and gain control for an amplifier circuit 330 which provides the reel limit signal in response to currents appearing at the summing junction 310. The noninverting input of amplifier 312 is coupled through an 11K resistor to ground.

Position arm sensing for the take-up position arm is provided by a light emitting diode 332 and a sensor 334 which is known as a photopotentiometer. The sensor 334 receives light from LED 322 through an aperture 336 of a mask which moves with the position of the tension arm for a take-up reel. A bar of light passing through mask 336 from LED 332 forms a conductive path between a resistor 338 and an output conductor 340. The resistor 338 is coupled between +12 volts and −12 volts so that the position of aperture 336 determines the voltage to which output conductor 340 is coupled. The sensor 334 thus operates very much like a potentiometer having a wiper arm that moves with tension arm position, with the aperture 336 corresponding to the wiper arm. The LED 332, sensor 334, aperture 336, resistor 338, and output conductor 340 thus operate as a tension arm position sense circuit 342 for the take-up tension arm to provide a bipolar analog take-up arm position signal which is coupled through 33K summing resistor 335 to junction 310. Similarly, a tension arm position sense circuit 346 for the supply tape tension arm provides a supply tape tension arm position signal which is coupled through summing resistor 348 to summing junction 310.

Transistor switch 328 is normally in a nonconductive condition to permit amplifier circuit 330 to operate in a normal manner. However, under some conditions transistor switch 328 is closed to in effect short circuit the output of operational amplifier 312 to the virtual ground at its inverting input to clamp the output of amplifier 312 at ground and effectively disable the reel sense circuit 160. The gate electrode of FET switching transistor 328 is coupled to the collector of an NPN transistor 350 and also through a current limiting resistor to +12 volts. The emitter of transistor 350 is connected to ground and the base of transistor 350 is coupled through a 10K resistor to an arm outer limit signal, TLO, and also through a 10K resistor and an inverter gate 352 to the play edit command signal, $\overline{PEC}$. During a play edit mode of operation, the roller 24 on take-up tension arm 22 is moved to a limit position where it engages the capstan 34 as a pinch roller. Since the signals for limiting capstan motion are generated as a simple summation of signals indicating tension arm position, this extreme take-up tension arm position would cause a reel limit signal to be generated that would interfere with control of capstan motor 100. During the play edit mode of operation therefor, transistor switch 328 is closed in response to signal $\overline{PEC}$ to disable or inhibit the reel limit signal. The TLO signal is generated to prevent backing up after a large reel of tape is stopped due to the arm position change caused by integration in the reel servos.

Signal TLO is generated by a limit sensing circuit 354 which includes an op amp 356 having an inverting input coupled through a 1.5 M resistor to +5 volts and a noninverting input coupled through a 470K resistor to the supply tension arm position signal at the output of position sensing circuit 346. A 0.001 microfarad capacitor connects the output of op amp 356 to its inverting input and a 6.8 M resistor connects the output of op amp 356 to its noninverting input to provide a small amount of positive feedback. Signal TLO is generated at the output of amplifier 356 and is normally at a low voltage. However, as the supply tension arm approaches an outer limit as tape tension is increased, the voltage of the tension arm position signal goes sufficiently high above 5 volts to cause the output of amplifier 356 to go high and generate a high voltage signal. This signal operates to disable the reel limit signal as explained above. The tension arm position at which signal TLO is activated is more extreme than that which is encountered during normal operation. During a normal acceleration to a high shuttle speed, the supply tension arm position signal would reach a sufficient magnitude to limit capstan motor 100 acceleration to the capability of the supply motor 322 before the supply tension arm position signal became of sufficient magnitude to activate the tape load override signal, TLO. Similarly, in the event that the take-up reel 320 is unable to keep up with acceleration of capstan motor 100 the take-up tension arm position signal becomes of sufficient magnitude to limit acceleration of capstan motor 100 to a rate which can be matched by reel motor 320. The polarity of the tension arm position signals depends upon the direction of acceleration of capstan motor 100 and is automatically of the proper polarity to limit acceleration. Similarly, the armature voltages of reel motors 320, 322, increase in magnitude as their velocities increase to provide signals to the summing junctions 310.

Normally, the speed of the reel motors 320, 322 is not a limiting factor even for a high speed shuttle operation. However, as the tape pack diameter on a reel becomes quite small, the reel motor speed must increase with the reciprocal of tape pack diameter. Therefore, for a small tape pack diameter, the reel motor velocity signals rapidly become effective to limit motion of the capstan motor 100 and prevent a reel motor overspeed condition. As a reel motor approaches a maximum speed, it will be unable to keep up with the capstan motor 100 and the corresponding tape tension arm will begin to move in response to the speed differential. However, because of the substantial kinetic energy of the rapidly rotating capstan motor 100 and reel motor, a significant tape loop buffer capacity would be required between a limit sense position and a tape loop out position to permit the capstan motor 100 to slow down in time to prevent a loop out condition. Thus, by sensing reel motor voltage as well as tape loop tension arm position, an impending reel motor speed limit condition can be sensed earlier than would be possible by sensing tension arm position alone and more effective use can be made of the buffer capacity of the tension arms.

The compensation filter 192 is shown in greater detail in FIG. 7, to which reference is now made. The quasi-digital position error signal from EXCLUSIVE-OR gate 190 is coupled through a pair of series connected 51K resistors to the base of an NPN transistor 360. The collector of transistor 360 is connected to +12 volts while the base is further connected through a 0.01 microfarad capacitor to ground and the emitter is connected through a 22K resistor to −12 volts and also through a 0.022 microfarad capacitor to the common point of the 251K base input resistors. The emitter of transistor 360 is also coupled through a second series connected pair of 51K resistors to the base of an NPN transistor 362. The base of transistor 362 is also coupled through a 0.0056 microfarad capacitor to ground and the collector is connected to +12 volts. The emitter of transistor 362 is coupled through a 22K resistor to −12 volts and is also coupled through a 0.056 microfarad capacitor to the common point of the second pair of base input resistors.

The position error signal, PE, is provided as an output at the emitter of transistor 362. When the quasi-digital input signal EXCLUSIVE-OR gate 190 is a symmetrical squarewave, the signal has an average D.C. value of approximately 2.5 volts. The forward conduction threshold base emitter threshold voltages of transistors 360 and 362 as well as the voltage drops across the two pairs of 51K base input resistors tends to provide an average D.C. voltage drop or level shift to permit signal PE to have a zero voltage value as the quasi-digital signal from the output of gate 190 approaches a symmetrical squarewave.

While there has been shown and described above a particular embodiment of a web transport system with a capstan motor motion energization system in accordance with the invention, it will be appreciated by those skilled in the art that the invention is not limited thereto. Accordingly, any modifications, variations or equivalent arrangements within the scope of the attached claims should be considered to be within the scope of the invention.

What is claimed is:

1. In a bidirectional web transport system having a web storage system disposed to supply and take up a length of web member moving along a web path, a single capstan positioned along the web path to engage and control the motion of a length of web member extending along the web path, a capstan motor coupled to drive the capstan, a tachometer coupled to sense capstan motor motion and generate actual motion information indicative of the speed and direction thereof and a reference motion signal generator generating a reference motion signal indicative of a commanded capstan motor reference speed, the improvement comprising:

a direction indicator circuit coupled to generate a direction signal indicative of actual capstan motor motion direction in response to the actual motion information;

a comparator coupled to respond to the reference motion signal and actual motion information by generating an overspeed signal when actual capstan motor speed exceeds the reference speed and a motion error signal having a magnitude and polarity indicative of a difference between actual speed and reference speed, the motion error signal having a first polarity tending to cause capstan motor energization for motion in a first direction when actual speed is less than the reference speed and having a second polarity opposite the first polarity tending to cause capstan motor energization for motion in a second direction opposite the first direction when actual speed is greater than the reference speed;

an inverter circuit coupled to receive and selectively invert the motion error signal in response to actual motion information and motion command information, the motion error signal having a first state of inversion when actual capstan motor motion is in the second direction and actual speed is greater than a commanded reference speed or when commanded capstan motor motion is in the second direction and actual capstan motor speed is not greater than a commanded reference motor speed or when motion stop is commanded and actual capstan motor motion is in the first direction, the motion error signal having a second state of inversion opposite the first state when actual capstan motor motion is in the second direction and actual speed is greater than a commanded reference speed, or when a commanded capstan motor motion is in the first direction and actual capstan motor speed is not greater than a commanded reference motor speed or when motion stop is commanded and actual capstan motor is in the second direction; and a motor drive circuit coupled to energize the capstan motor in accordance with the magnitude and polarity of the motion error signal as selectively inverted by the inverter circuit.

2. The improvement in a web transport system according to claim 1 above, wherein the actual motion information from the tachometer includes a two state actual position signal indicating equal distance increments of capstan motor motion by transitions between states and wherein the reference motion signal is a two state position signal indicating equal distance increments of motion by transitions between states.

3. The improvement in a web transport system according to claim 2 above, wherein the comparator is a phase comparator generating the motion error signal with a first polarity when the phase of the actual position signal lags a given phase relationship to the reference motion signal and with a second polarity when the phase of the actual position signal leads the given phase relationship to the reference motion signal.

4. The improvement in a web transport system according to claim 3 above, wherein the magnitude of the motion error signal is indicative of the difference between the actual phase relationship of the actual position signal relative to the motion reference signal and the given phase relationship.

5. The improvement in a web transport system according to claim 4 above, wherein the motion error signal is a two state signal indicating the difference between the given and actual phase relationship by the average value thereof over a period of time required for two transitions of the reference motion signal.

6. The improvement in a web transport system according to claim 5 above, wherein the inverter circuit includes an EXCLUSIVE-OR circuit receiving the motion error signal as one input, receiving a two state inversion control signal as a second input and generating a selectively inverted motion error signal as an output, and circuitry generating the inversion control signal in response to the overspeed signal, the actual direction information from the tachometer and operating commands.

7. The improvement in a web transport system according to claim 6 above, wherein the inversion control signal has a first state when actual capstan motor motion is in the first direction and motion stop is commanded and when actual capstan motor motion is in the second direction and the overspeed signal is generated while operation at a reference speed is commanded and when the overspeed signal is not generated while capstan motor motion in the second direction is commanded and a second state opposite the first state when actual capstan motor motion is in the second direction and motion stop is commanded, and actual capstan motor motion is in the first direction and the overspeed signal is generated while operation at a reference speed is commanded and when the overspeed signal is not generated while capstan motor motion in the first direction is commanded.

8. The improvement in a web transport system according to claim 7 above, wherein the inversion control signal has the logical function $$DRF = T \cdot STC + \overline{STC} \cdot [T \cdot OSL \cdot RS + \overline{OSL} \cdot DRFC + \overline{RS} \cdot DRFC]$$

where
- DRF is the inversion control signal,
- T is an actual direction signal that is true when actual capstan motor motion is in the second direction,
- STC is a stop command signal that is true in response to a motion stop command,
- OSL is the overspeed signal generated by the comparator,
- RS is a speed command commanding capstan motor motion at a speed indicated by the reference signal, and
- DRFC is a direction signal that is true in response to a command for capstan motor motion in the second direction.

9. The improvement in a web transport system according to claim 8 above, wherein the term RS has the logical function $$RS = PC + SPC$$

where PC is a play command signal indicating operation at a play/record speed, where SPC is a spooling command signal indicating operation at a spooling speed greater than the play/record speed and wherein the reference motion signal generator responds to the PC and SPC signals by generating a reference motion signal indicative of a commanded speed.

10. The improvement in a web transport system according to claim 7 above, further comprising an acceleration control circuit responsive to the inversion control signal and coupled to generate a constant acceleration signal controlling the motor drive circuit to accelerate the capstan motor at a constant rate when applied to the motor drive circuit, the direction of capstan motor acceleration being dependent upon the state of the inversion control signal; and a switching circuit coupling not more than one of said selectively inverted motion error signal and said constant acceleration signal to the motor drive circuit.

11. The improvement in a web transport system according to claim 10 above, further including a motion sensor coupled to receive actual motion information from the tachometer and generate a motion stopped signal upon termination of capstan motor motion, and wherein the switching circuit includes circuitry for coupling the selectively inverted motion error signal to the motor drive circuit when capstan motor motion at a speed indicated by the reference motion signal is commanded and the underspeed signal is not present and for coupling the constant acceleration signal to the motor drive circuit when the underspeed signal is generated and when a motion stop is commanded while the motion stopped signal is not being generated.

12. The improvement in a web transport system according to claim 11 above, wherein the switching circuit includes circuitry coupling the constant acceleration signal to the motor drive circuit in response to a shuttle command commanding a capstan motor speed greater than any speed commanded by the speed reference signal and wherein the motor drive circuit includes means for limiting the maximum magnitude of voltage applied to the capstan motor by the motor drive circuit.

13. The improvement in a web transport system according to claim 12 above, wherein the motor drive circuit is arranged to accelerate the capstan motor at a rate proportional to an input signal coupled thereto by the switching circuit.

14. The improvement in a web transport system according to claim 12, further comprising a compensation control circuit coupled to control the gain and frequency response of the selectively inverted motion error signal in response to the overspeed and underspeed signals, the compensation control circuit providing a first gain and a first frequency response when the underspeed signal is generated and a second gain greater than the first gain and a second frequency response with low frequency phase lag when either the overspeed signal or the speed locked signal is generated.

15. A web transport system comprising:
a web storage system positioned to supply and take up a length of web member moving along a web path;
a single capstan positioned to engage a length of web member in nonslip relationship to control web member motion along the web path;
a capstan motor coupled to rotationally drive the capstan in accordance with capstan motor rotation; and
a motor energization system coupled to energize the capstan motor, the motor energization system including (1) a tachometer coupled to sense capstan motion and generate a direction signal indicative of the direction of capstan motion and an actual motion signal indicative of actual capstan speed, (2) a reference generator generating a reference motion signal indicative of desired capstan speed, (3) a comparator coupled to compare the reference and actual motion signals and generate a motion error signal having a relative polarity and magnitude indicative of the difference therebetween, (4) a direction control circuit coupled to selectively invert the polarity of the motion error signal in response to operator commands and actual capstan motor motion information, the polarity of the motion error signal being in a first state of inversion selected to command capstan motor energization for acceleration in a first direction when web motion in a first direction is commanded and actual speed is not greater than the reference speed, the first state of inversion also being commanded when actual motion is in the first direction and actual speed is greater than the reference speed or when motion stop is commanded and actual motion is in a second direction opposite the first direction, a second state of inversion opposite the first state being selected when web motion in a second direction is commanded and actual speed is not greater than reference speed, or actual motion is in the second direction and actual speed is greater than a first speed and (5) a motor drive circuit coupled to energize the capstan motor in response to the magnitude and polarity of the motion error signal.

16. A web transport system comprising:
a web storage system positioned to supply and take up a length of a web member as the length of web member moves along a web path;
a capstan positioned along the web path for continuous engagement with a length of web member to control the motion of the length of web member along the web path;
a direct current motor coupled to rotationally drive the capstan in accordance with rotation of the motor; and a motor energization system coupled to energize the motor, the motor energization system including a current driver coupled to energize the motor with current of a polarity and magnitude indicated by an applied energization command, the current driver including an amplifier having an output coupled to energize the motor and an inverting input coupled to receive the energization command signal and also including a current feedback circuit coupled to provide a current feedback signal to the negative input that is indicative of actual motor current, the current feedback signal being opposite in polarity and equal in magnitude to the energization command signal when actual motor current equals commanded motor current, a position reference signal indicating a motor reference position which changes at a nonzero rate with respect to time, an actual motor position detector generating an actual position signal indicating actual rotational position of the motor and a comparator coupled to compare the actual position signal and the reference position signal and generate an energization command signal indicative of the difference between actual and reference motor positions, the current driver further including a bipolar voltage limiting circuit which limits the maximum positive and negative voltages that can be applied across the motor.

17. The web transport system according to claim 16 above, wherein the voltage limiting circuit limits the maximum voltage of each polarity to a magnitude less than a power supply voltage applied to the current driver.

18. A web transport system comprising:
a web storage system positioned to supply and take up a length of a web member as the length of web member moves along a web path;
a capstan positioned along the web path for continuous engagement with a length of web member to control the motion of the length of web member along the web path;
a direct current motor coupled to rotationally drive the capstan in accordance with rotation of the motor;
a motor energization system coupled to energize the motor, the motor energization system including a current driver coupled to energize the motor with current of a polarity and magnitude indicated by an applied energization command, a position reference source generating a position reference signal indicating a motor reference position which changes at a nonzero rate with respect to time, an actual motor position detector generating an actual position signal indicating actual rotational position of the motor and a comparator coupled to compare the actual position signal and the reference position signal and generate an energization command signal indicative of the difference between actual and reference motor positions;
velocity error detection circuitry coupled to detect and indicate actual motor velocities less than the nonzero time rate of change of position indicated by the position reference signal;
an acceleration command circuit generating an acceleration command signal commanding a constant motor current of a polarity dependent upon an operator determined direction of motion;
circuitry generating a second energization command signal in response to the acceleration command signal; and
a switching network responsive to operator commands and the velocity error detection circuitry, the switching network operating to apply a selected one of the energization command signals to the current driver, the energization command signal from the comparator being applied only when a speed indicated by the position reference signal is commanded by an operator and an actual motor velocity less than that indicated by the position reference signal is not indicated.

19. The web transport system according to claim 18 above, wherein the current driver includes a bipolar voltage limiting circuit which limits the maximum voltage of any polarity that can be applied across the motor, the maximum speed of the motor being determined by the maximum voltage when a fastest motor speed is commanded by an operator.

20. The web transport system according to claim 19 above, further comprising a torque bias circuit coupled to apply a torque bias command to the negative input which is summed with any other inputs thereto, the torque bias command being generated only during an operator commanded mode of operation in which a buffer loop providing a tape tension is maintained in the web by the web storage system only on one side of the capstan and the torque bias command is of a polarity and magnitude to command a motor current that produces a motor torque which balances torque applied to the motor by the tape tension on the one side.

21. A web transport system comprising:
a web storage system positioned to supply and take up a length of a web member as the length of web member moves along a web path;
a capstan positioned along the web path for continuous engagement with a length of web member to control the motion of the length of web member along the web path;
a direct current motor coupled to rotationally drive the capstan in accordance with rotation of the motor;
a motor energization system coupled to energize the motor, the motor energization system including a current driver coupled to energize the motor with current of a polarity and magnitude indicated by an applied energization command, a position reference source generating a position reference signal indicating a motor reference position which changes at a nonzero rate with respect to time, an actual motor position detector generating an actual position signal indicating actual rotational position of the motor and a comparator coupled to compare the actual position signal and the reference position signal and generate an energization command signal indicative of the difference between actual and reference motor positions; and
a limiting circuit coupled to limit the maximum motor energization commanded by the energization command signal to a level at which tape motion will not exceed the capabilities of the web storage system to supply and take up tape under any normal operating conditions.

22. A web transport system comprising:
a web storage system positioned to supply and take up a length of a web member as the length of web member moves along a web path;

a capstan positioned along the web path for continuous engagement with a length of web member to control the motion of the length of web member along the web path;

a direct current motor coupled to rotationally drive the capstan in accordance with rotation of the motor;

a motor energization system coupled to energize the motor, the motor energization system including a current driver coupled to energize the motor with current of a polarity and magnitude indicated by an applied energization command, a position reference source generating a position reference signal indicating a motor reference position which changes at a nonzero rate with respect to time, an actual motor position detector generating an actual position signal indicating actual rotational position of the motor and a comparator coupled to compare the actual position signal and the reference position signal and generate an energization command signal indicative of the difference between actual and reference motor positions;

a web storage system protection circuit coupled to generate a motor energization reduction signal of a magnitude indicative of operational demands placed on the web storage system and of a polarity tending to reduce motor energization;

an acceleration command circuit generating an acceleration command signal of constant magnitude and of a polarity dependent upon an operator commanded direction of motion, the energization reduction signal and the acceleration command signal being combined to form a second energization command signal; and switching circuitry coupled to apply a given one but not both of the first mentioned and second energization command signals to the current driver in response to operator commands.

23. The web transport system according to claim 22 above, wherein the web storage system includes a pair of reels positioned along the web path on either side of the capstan, a pair of reel motors coupled to drive the reels, a pair of web member buffer elements, each positioned between the capstan and a different reel to maintain a length of web in a buffer loop, and a pair of loop length detectors, each coupled to generate a bipolar loop length signal for a different one of the buffer loops that indicates loop length by varying between positive and negative values as loop length varies between long and short loop positions, and wherein the protection circuit includes summing circuitry generating the energization reduction signal as the simple sum of the bipolar loop length signals and bipolar signals indicating voltage across the pair of reel motors.

24. The web transport system according to claim 23 above, further comprising a load enable circuit coupled to inhibit the energization reduction signal when a selected one of the loop length signals exceeds a given magnitude greater than any magnitude encountered thereby during normal system operation.

25. A web transport system comprising;

a web storage system positioned to supply and take up a length of a web member as the length of web member moves along a web path;

a capstan positioned along the web path for continuous engagement with a length of web member to control the motion of the length of web member along the web path;

a direct current motor coupled to rotationally drive the capstan in accordance with rotation of the motor; and a motor energization system coupled to energize the motor, the motor energization system including a current driver coupled to energize the motor with current of a polarity and magnitude indicated by an applied energization command, a position reference source generating a position reference signal indicating a motor reference position which changes at a nonzero rate with respect to time, an actual motor position detector generating an actual position signal indicating actual rotational position of the motor and a comparator coupled to compare the actual position signal and the reference position signal and generate an energization command signal indicative of the difference between actual and reference motor positions, the comparator including circuitry generating a speed locked signal when actual motor velocity is equal to a time rate of change of position commanded by the reference signal and the comparator further including a gain control circuit coupled to receive the speed locked signal and to increase the D.C. gain of the energization command signal when the speed locked signal is generated relative to the gain of the energization command signal when the speed locked signal is not generated.

26. A magnetic tape transport system comprising:

a tape storage system positioned to supply and take up a length of tape as a tape member moves along a tape path under control of a single tape drive capstan;

a capstan positioned along the tape path for continuous, nonslip engagement with a tape member;

a direct current capstan motor coupled to drive the capstan in accordance with motor rotation, the motor generating a torque that is approximately linearly proportional to motor current; and a motor energization system coupled to energize the capstan motor, the motor energization system including a current driver coupled to energize the capstan motor with a current that is linearly proportional to the sum of applied energization commands and further including an energization command system that is responsive to operator commands, the energization command system including (A) a position reference source generating a position reference signal indicating both a commanded rotational position and nonzero rotational velocity for the capstan motor, (B) an actual motor position detector generating an actual position signal indicating both actual position and actual velocity of the capstan motor, (C) a comparator coupled to compare the actual position signal with the reference position signal and (C1) generate a position error signal that varies continuously with the difference between actual and commanded capstan motor positions and (C2) generate a speed locked signal when commanded and actual capstan motor velocities are approximately equal, (D) an acceleration signal generator coupled to generate an acceleration signal of fixed magnitude in response to operator direction commands, (E) an underspeed signal generator coupled to generate an underspeed signal when actual motor velocity is less than the velocity commanded by the reference position signal, (F) and a switching system responsive to operator commands, the speed locked signal and the underspeed signal, and coupled (F1) to apply the position error signal to the current driver as an energization command signal when the speed locked signal is being generated and (F2) to apply the acceleration signal to the current driver as an energization command signal whenever an underspeed signal is generated.

27. A magnetic tape transport system comprising:
a tape storage system positioned to supply and take up a length of tape as a tape member moves along a tape path under control of a single capstan;
a single drive capstan positioned along the tape path for continuous, nonslip engagement with a tape member;
a direct current capstan motor coupled to drive the capstan in accordance with motor rotation;
a motor energization system coupled to energize the capstan motor, the motor energization system including a motor drive circuit coupled to energize the capstan motor to produce a motor acceleration that is linearly proportional to the sum of applied energization commands and an energization command system that is responsive to operator commands, the energization command system including (A) circuitry for generating (A1) a play command in response to an operator command requiring operation at a first given speed at which recording and reproducing of information on tape occurs, (A2) a spooling command in response to an operator command requiring operation at a second given speed greater than the first given speed, (A3) a shuttle command in response to an operator command to move tape at a speed greater than the second given speed, (A4) a stop command in response to an operator command to stop tape motion, and (A5) a direction command indicating an operator commanded direction of motion; (B) an A.C. reference signal generator generating an A.C. reference signal, the reference signal having a given first frequency in response to a play command and a given second frequency greater than the first frequency in response to a spooling command; (C) a tachometer coupled to generate an A.C. tachometer signal having transitions between signal levels which have a predetermined relationship to capstan motor rotational position; (D) a comparator coupled to respond to the reference signal and the tachometer signal and generate an underspeed signal when the frequency of the tachometer signal is less than the frequency of the reference signal and a position error signal that varies with the phase difference between the reference and tachometer signals when their frequencies are substantially equal; (E) an acceleration generator coupled to generate an acceleration signal of fixed magnitude and of a polarity determined in accordance with a required direction of acceleration; and (F) a switching network coupled to apply the position error signal to the motor drive circuit as an energization command when the underspeed signal is not being generated and either a play command or a spooling command is being generated and coupled to apply the acceleration signal to the motor drive circuit as an energization command when the underspeed signal is generated or a shuttle command is generated or a stop command is generated while the capstan motor is rotating.

28. A web transport system comprising:
a web storage system positioned to supply and take up a length of web member as the length of web member moves along a web path;
a capstan positioned along the web path to control the motion of the length of web member along the web path;
a motor coupled to rotationally drive the capstan in accordance with rotation of the motor; and
a motor energization system coupled to energize the motor, the motor energization system including (1) a motor drive amplifier circuit coupled to energize the motor in response to an energization command, (2) a digital tachometer circuit generating digital information signals indicative of actual rate and direction of motion of tape at the capstan, (3) a reference signal generator generating a digital velocity reference signal indicative of a reference rate of tape motion, (4) a phase comparator coupled to compare signals indicative of actual and reference rates of tape motion and generate an underspeed signal when the indicated actual rate of motion is less than the reference rate and an error signal indicative of a difference between an actual and a predetermined phase relationship between the signals indicating actual and reference rates of motion, (5) a switching circuit responsive to the underspeed signal and to operate commands and arranged to couple the error signal to the motor drive amplifier circuit as an energization command signal only when the underspeed signal does not indicate an underspeed condition and operator commands indicate a mode of operation wherein tape velocity is to equal the reference rate of motion, and (6) an acceleration circuit responsive to the underspeed signal and to operator command signals, the acceleration circuit generating a constant acceleration signal and including switching circuitry coupling the constant acceleration signal to the motor drive amplifier circuit as an energization command signal commanding energization to produce a constant rate of web acceleration only when web motion is commanded and the underspeed signal indicates an underspeed condition or a rate of motion greater than the reference rate is commanded or zero web motion is commanded and the web is moving, the motor energization then being of a polarity tending to reduce web speed in the vicinity of the capstan.

29. The web transport system according to claim 28 above, wherein the motor energization control system further includes (7) an error signal gain and compensation control circuit coupled to increase the gain and lag compensation of the error signal when the underspeed signal does not indicate an underspeed condition.

30. The web transport system according to claim 28 above, wherein the digital tachometer and reference signal generator both generate digital signals indicating equal increments of actual and reference incremental web motion by transitions therein.

31. The web transport system according to claim 30 wherein the motor energization control signal further includes frequency doubler circuits coupling the reference rate and actual rate indicating signals to the phase comparator, the frequency doubler circuits providing an output pulse to the comparator circuit for each transition of a respective reference rate and actual rate indicating signal.

32. The web transport system according to claim 31 above, wherein the digital tachometer circuit includes a light source, a photosensitive device generating an output signal proportional to light incident thereon, a disk coupled for rotation with the motor having alternate and equal transparent and opaque areas thereon positioned to intercept light passing from the light source to the photosensitive device as the disk rotates, an amplifier having a high open loop voltage gain, an output, an inverting input being coupled through a series connected capacitor to the photosensitive device output signal and being coupled through an impedance to the amplifier output, the noninverting input being clamped one PN diode forward conduction voltage drop away from a fixed voltage potential, a bipolar transistor having a collector, an emitter connected to the fixed voltage potential and a base coupled to the output of the amplifier, and means for generating the actual rate indicating digital information signal in response to a voltage appearing at the collector.

33. A magnetic tape transport system comprising:
a tape storage system positioned to supply and take up tape moving along a tape path;
a single capstan positioned to control the motion of tape along the tape path;
a capstan motor coupled to rotationally drive the capstan; and
a motor energization system coupled to energize the capstan motor, the energization system including (1) an error signal generator coupled to sense actual tape speed, compare actual tape speed with commanded tape speed, generate a motion error signal indicative of the difference between actual tape speed and a commanded tape speed, and generate a speed locked signal when actual tape speed equals commanded tape speed (2) a motor drive amplifier coupled to energize the capstan motor in response to the motion error signal and (3) compensation circuitry coupled to respond to the speed locked signal by increasing the magnitude of low frequency components of capstan motor energization relative to the magnitude of the difference indicated by the error signal whenever the speed locked signal is generated.

34. A magnetic tape transport system comprising:
a tape storage system disposed to supply and take up tape moving along a tape path having a transducer head positioned therealong;
a single capstan disposed to control the motion of tape along the tape path;
a capstan motor coupled to rotationally drive the capstan; and
a motor energization system coupled to energize the capstan motor, the energization system including (1) a motor drive amplifier coupled to energize the capstan motor in response to a motor energization command, (2) a comparator circuit coupled to sense actual tape speed, compare actual tape speed with a commanded tape speed, generate a motion error signal indicating the difference between actual and commanded tape speed, generate a speed locked signal when actual tape speed equals a commanded tape speed, and generate an underspeed signal when actual tape speed is less than a commanded tape speed, (3) a constant acceleration circuit generating a constant acceleration signal commanding the motor drive amplifier to energize the capstan motor for constant acceleration, (4) an amplifier circuit coupled to receive the motion error signal as an input and to generate an amplified motion error signal as an output, the amplifier circuit including compensation circuitry responsive to the speed locked signal for increasing the amplification and increasing the low frequency response of the amplified motion error signal relative to the motion error signal, and (5) a switching circuit connected to selectively couple a motion energization command to the motor drive amplifier, the motor energization command being the amplified motion error signal in response to the speed locked signal and the constant acceleration signal in response to the underspeed signal.

35. The tape transport system according to claim 34 above, wherein the amplifier circuit includes an inverting amplifier having an inverting input coupled to receive the motion error signal and an output generating the amplified motion error signal, first and second resistances coupled in series between the output and inverting input, a capacitor connected in parallel with the second resistance and a switching element coupled to short circuit the capacitor and second resistance in the absence of a speed locked signal.

36. The tape transport system according to claim 35 above, further comprising signal limiting circuitry coupled between the output and inverting input of the inverting amplifier to limit the maximum amplitude of voltage therebetween.

37. The tape transport system according to claim 35 above, further comprising first lead compensation circuitry coupling the amplified motion error signal from the inverting amplifier to the switching circuit and second lead compensation circuitry coupling the motion error signal to the inverting input of the inverting amplifier.

38. A tape transport comprising:
a tape storage system positioned to supply and take up a length of tape as the length of tape moves along a tape path;
a capstan positioned along the tape path for continuous engagement with the length of tape to control bidirectional motion of the tape along the tape path;
a bidirectional motor coupled to rotationally drive the capstan in accordance with rotation of the motor; and
a motor energization system coupled to energize the motor to control bidirectional motion of the length of tape along the tape path, the motor energization system being responsive to operator commands and being operable to drive the motor at a first, closely regulated speed in response to an operator command to move tape at a nominal record or reproduce speed, to drive the motor at a second speed greater than the first speed by at least a factor of 5 in response to an operator command requiring tape motion at a high speed, to stop the motor in response to an operator command requiring zero tape speed and to permit the capstan motor to rotate freely in response to operator manipulation and without opposing the rotation in response to an operator command enabling manual control over capstan rotation by an operator while the tape storage system continues to supply or take up take moving along the tape path.

39. The tape transport according to claim 38 above, wherein the motor energization system includes means for accelerating the motor at a controlled and constant rate throughout each acceleration interval.

40. The tape transport according to claim 38 above, wherein during at least one mode of operation a tension differential exists along the tape on opposite sides of the capstan which results in a torque being applied to the motor by the capstan and further comprising means operable when a tape tension differential exists across the capstan for electrically energizing the motor to produce a constant torque which compensates and opposes the torque resulting from the tape tension differential.

41. The tape transport according to claim 38 above, wherein the motor energization system operates in response to an operator command requiring tape motion along the tape path while the take up of tape by the tape storage system is disabled, by driving the motor at a constant speed and includes means operative when the take up of tape is disabled during constant speed tape path tape motion for electrically energizing the motor to apply a constant torque energization to the motor which compensates and opposes a torque applied to the motor as a result of a tape tension differential on opposite sides of the capstan.

42. The tape transport according to claim 38 above, wherein tape speed is at least 180 ips when the motor is rotating at the second velocity.

43. The tape transport according to claim 42 above, wherein tape speed is not greater than 30 ips when the motor is rotating at the first velocity.

44. The tape transport according to claim 39 above, wherein the motor acceleration rate is sufficient to produce a tape length acceleration rate throughout a start-stop interval of at least approximately 60 inches per second squared.

45. The tape transport according to claim 38 above, wherein the motor energization system is operative in response to an operator command requiring tape motion at an intermediate speed to drive the motor at a third, closely regulated velocity greater than the first velocity and less than the second velocity.

46. A web transport system comprising:
a web storage system positioned to supply and take up a length of web member as the web member moves along a web path, the web storage system including first and second direct current reel motors coupled to drive first and second web member storage reels respectively, a first web loop buffer mechanism positioned between one end of the web path and a first reel of web member and a second web loop buffer mechanism positioned between an end of the web path opposite the one end and a second reel of web member;
a single drive capstan positioned along the web path for constant engagement with a web member to control bidirectional motion of a length of web member along the web path;
a summing system coupled to sense voltage across the first and second reel motors and sense the length of web loop stored by the first and second web loop buffer mechanisms, the summing system generating storage system status information indicative of the sum of the first and second reel motor voltages and web loop lengths for the first and second web loop buffer mechanisms;
a capstan motor energization system coupled to electrically energize the capstan motor in response to motor command signals and the storage system status information, the energization system being operable in at least one mode to decrease the magnitude of capstan motor energization in accordance with the storage system status information, there being no step function changes in the capstan motor energization during an acceleration interval due to the storage system status information.

47. The web transport system according to claim 46 above, wherein the summing system includes a summing junction, a first impedance coupled between the first reel motor and the summing junction, a second impedance coupled between the second reel motor and the summing junction, first and second loop length sensors coupled to sense a length of web loop stored by the first and second web loop buffer mechanisms respectively and generate outputs varying continuously with stored loop length, a third impedance coupled between the first loop length sensor and the summing junction and a fourth impedance coupled between the second loop length sensor and the summing junction, the storage system status information being present at the junction.

48. The web transport system according to claim 47 above, wherein the outputs from the first and second loop length sensors have magnitudes which are zero at intermediate loop lengths and increase with loop length deviations from said intermediate loop lengths, the polarity of an output being determined by whether loop length is longer or shorter than the respective intermediate loop length.

49. The web transport system according to claim 48 above, wherein when the first reel motor is rotating to supply web material to the web path the polarity of the voltage coupled to the first impedance is the same as (1) the polarity of the voltage coupled to the second impedance when the second reel motor is rotating to take up web material from the web path, (2) the polarity of the output from the first loop length sensor when the length of loop stored by the first web loop buffer mechanism is less than the intermediate length and (3) the polarity of the output from the second loop length sensor when the length of loop stored by the second web loop buffer mechanism is greater than the intermediate length.

50. A magnetic tape transport for playing and recording audio information comprising:
means for supplying tape to a tape path as required by tape motion along the path, the supplying means including means for providing a first buffer loop of tape;
means for taking up tape from the tape path as required by tape motion along the path, the taking up means including means for providing a second buffer loop of tape;
a single drive capstan positioned for continuous engagement with a tape to control tape motion along the tape path, the capstan having a cylindrical tape engaging circumference with a diameter of at least 1.5 inch;
a D.C. capstan motor coupled directly to the drive capstan;
a motor drive amplifier coupled to energize the capstan motor in response to a motor energization command signal;
a first servo control system including means for generating an actual speed signal indicative of the capstan motor rotational speed and means for comparing the actual speed signal with a reference signal indicating a speed and generating a first motor energization command signal indicative of a difference between the actual speed and reference speed signals;

a second servo control system coupled to generate a second energization command signal commanding a controlled rate of acceleration of the capstan motor throughout an acceleration interval; and a switching circuit coupled to respond to actual capstan motor rotational speed to couple the second but not the first energization command signal to the motor drive amplifier for acceleration toward a speed indicated by the reference signal and to couple the first but not the second energization command signal to the motor drive amplifier when actual capstan motor speed equals the speed indicated by the reference signal.

51. The magnetic tape transport according to claim 50 above, wherein the first servo control system is a phase lock servo control system with the actual speed signal generating means generating an A.C. actual speed signal having a frequency indicative of capstan motor rotational speed and with comparing and generating means generating the first motor energization signal in respond to a phase relationship between the actual speed signal and the reference signal.

52. The magnetic tape transport according to claim 50 above, wherein the second motor energization command signal is a constant magnitude signal and the motor drive amplifier is coupled to drive the capstan motor with a current indicated by a motor energization command signal applied thereto.

* * * * *